(12) United States Patent
Aher et al.

(10) Patent No.: US 11,675,843 B2
(45) Date of Patent: Jun. 13, 2023

(54) SYSTEMS AND METHODS FOR PROVIDING PERSONALIZED ANSWERS WITH LEARNED USER VOCABULARY FOR USER QUERIES

(71) Applicant: Rovi Guides, Inc., San Jose, CA (US)

(72) Inventors: Ankur Anil Aher, Maharashtra (IN); Harish Ashok Kumar, Tamil Nadu (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/253,580

(22) PCT Filed: Dec. 10, 2018

(86) PCT No.: PCT/US2018/064717
§ 371 (c)(1),
(2) Date: Dec. 17, 2020

(87) PCT Pub. No.: WO2020/122857
PCT Pub. Date: Jun. 18, 2020

(65) Prior Publication Data
US 2021/0294857 A1    Sep. 23, 2021

(51) Int. Cl.
*G06F 16/9032* (2019.01)
*G06F 16/957* (2019.01)
*G06F 16/9038* (2019.01)

(52) U.S. Cl.
CPC .... *G06F 16/90332* (2019.01); *G06F 16/9038* (2019.01); *G06F 16/9574* (2019.01)

(58) Field of Classification Search
CPC ........... G06F 16/90332; G06F 16/9038; G06F 16/9574
See application file for complete search history.

(56) References Cited

U.S. PATENT DOCUMENTS

| 7,917,497 B2 | 3/2011 | Harrison et al. |
| 8,150,676 B1 * | 4/2012 | Kaeser .................... G06F 40/56 715/260 |

(Continued)

FOREIGN PATENT DOCUMENTS

EP    3131023 A1    2/2017

OTHER PUBLICATIONS

Eriks Sneiders, "Automated Question Answering Using Question Templates That Cover the Conceptual Model of the Database", Sneiders E. (2002) Automated Question Answering Using Question Templates That Cover the Conceptual Model of the Database. Natural Language Processing and Information Systems. NLDB 2002. Lecture Notes in Computer Science, vol. 2553., Feb. 28, 2003, 235-239.

(Continued)

*Primary Examiner* — Taelor Kim
(74) *Attorney, Agent, or Firm* — Haley Guiliano LLP

(57) ABSTRACT

Systems and methods for providing personalized answers to a user's query using a learned user vocabulary. A natural-language user interface (NLUI) application tracks input terms in user queries and generates responses that incorporate those input terms. The NLUI application may modify stored response templates or may modify a response generated based on stored response templates, by replacing a template term with an input term that has a common definition.

20 Claims, 17 Drawing Sheets

(56) References Cited

U.S. PATENT DOCUMENTS

| | | | |
|---|---|---|---|
| 9,613,003 B1* | 4/2017 | Goodspeed | G06F 16/9038 |
| 2012/0143839 A1* | 6/2012 | Zhou | G06F 16/951 |
| | | | 707/706 |
| 2017/0161319 A1 | 6/2017 | Venkataraman et al. | |
| 2018/0357282 A1* | 12/2018 | Ambartsumov | G06Q 30/016 |

OTHER PUBLICATIONS

Mairesse Francois, et al., "Towards personality-based user adaptation: psychologically informed stylistic language generation", Mairesse, F., Walker, M.A. Towards personality-based user adaptation: psychologically informed stylistic language generation. User Model User-Adap Inter 20, 227-278 (2010). https://doi.org/10.1007/s11257-010-9076-2, Jul. 3, 2010, 227-278.

McClendon, Jerome L., "The Use of Paraphrase Identification in the Retrieval of Appropriate Responses for Script Based Conversational Agents", Jerome L Mcclendon et al: "The Use of Paraphrase Identification in the Retrieval of Appropriate Responses for Script Based Conversational Agents", Twenty-Seventh International Flairs Conference, May 21, 2014 (May 21, 2014), Pensacola Beach, California, US, May 21, 2014, abstract.

International Search Report and Written Opinion in PCT/US2018/064717 dated Aug. 29, 2019.

* cited by examiner

200

Input Query
202

| Show me | flicks | with Tom Cruise |

204 — Display Action
206 — Requested Information
208 — Information Modifier

Response Templates
210

MOVIE RESPONSE TEMPLATES
We found several movies with <Information Modifier> for you.
Here are some movies playing near you.
An upcoming movie with <Information Modifier> is:
Why not watch a movie with <Information Modifier> such as:
We found no movies with <Information Modifier>.

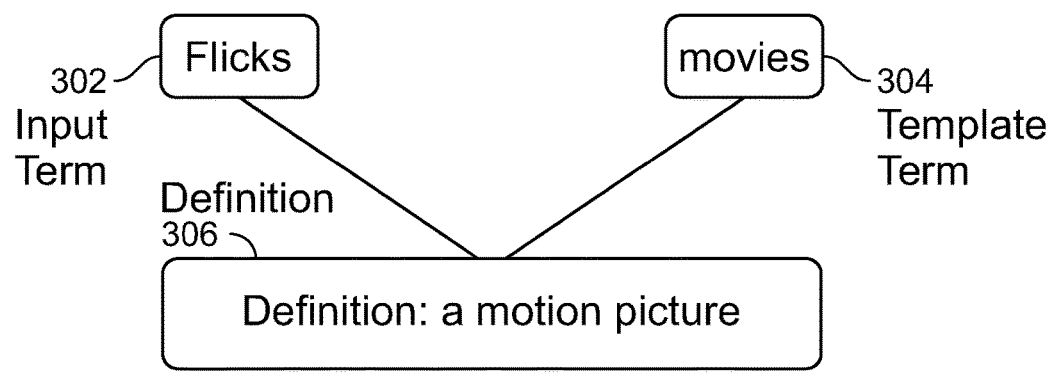

302 Input Term — Flicks
304 Template Term — movies
Definition 306 — Definition: a motion picture Modified Response Template
308

MOVIE RESPONSE TEMPLATES
We found several flicks with <Information Modifier> for you.
Here are some flicks playing near you.
An upcoming flick with <Information Modifier> is:
<Information Modifier> acts in Hollywood flicks.
We found no flicks with <Information Modifier>.

FIG. 3

SYSTEMS AND METHODS FOR PROVIDING PERSONALIZED ANSWERS WITH LEARNED USER VOCABULARY FOR USER QUERIES

CROSS-REFERENCE TO RELATED APPLICATION

This application is a United States National Phase Application filed under 35 U.S.C. § 371 of International Patent Application No. PCT/US2018/064717, filed on Dec. 10, 2018 which is hereby incorporated by reference in its entirety.

BACKGROUND

Summary

Natural language processing has enabled user interfaces, such as virtual assistants, to sound more human in response to user queries. For example, if a user asks, "What is the temperature right now?" an NLUI application may respond with an answer such as, "Better wear a jacket because it is forty degrees Fahrenheit," instead of a straightforward answer such as, "Forty degrees Fahrenheit." The dynamic answer is employed to socially engage the user and enhance comprehension. One approach to providing dynamic answers involves using pre-generated response templates with blank fields (e.g., "Better wear a jacket because it is <temperature>"). In this approach, the NLUI application identifies a response template that answers the user's query and can contain the information requested, such as the temperature. However, this approach simply appends fixed text strings to the desired information. The system ultimately remains confined to a predetermined vocabulary hard-coded by its developers. In a situation where the user does not understand the words used in the response template, the dynamic answer may actually prove to be too complex, thus weakening user comprehension. In order to address these issues, a NLUI application should learn user vocabulary and constantly update its responses to be more suitable for the user.

Systems and methods are described herein for providing personalized answers to a user's query through a learned user vocabulary generated based on query terms. In one embodiment, a NLUI application receives a query and identifies a stored response template that answers the query. The stored response template contains multiple template terms that the user providing the query may or may not understand. To improve user comprehension, the NLUI application identifies input terms in the query that can replace the template terms. This ensures that the output response consists of terms that the user is familiar with. The NLUI application compares the definitions of the terms used in the query and the terms used in the response template. In response to determining that the query includes an input term that shares a definition with a template term (e.g., the respective terms are synonyms), the NLUI application generates a modified template. This modified template may have the same terms and sentence structure as the stored response template, but the template term in the modified template is replaced with the input term. The NLUI application generates and outputs a response to the query based on the modified template. As a result, the response contains the input term in place of the template term. In addition to outputting the response, the NLUI application determines and outputs a search result for the query.

To generate the modified template, the NLUI application may create a copy of the stored response template and may substitute the template term in the copy of the stored response template with the input term. In some embodiments, the NLUI application stores the copy of the stored response template as a new modified template in memory. Alternatively, the NLUI application may directly modify the stored response template by replacing the template term and may store the modifications.

In some embodiments, generating a modified template is optimal. In one implementation, instead of or in addition to generating the modified template, the NLUI application generates a response to the query and identifies an input term in the query that shares a definition with a template term in the generated response. Prior to outputting the response, the NLUI application modifies the response to replace the template term with the input term. This allows for the user to receive a response that contains terms that the user is familiar with, without the NLUI application having to necessarily create a new template or alter the stored response template. The NLUI application then outputs the modified response.

In some embodiments, the NLUI application replaces the template term with the input term in both the output response and a generated modified template. Subsequent to receiving a query, the NLUI application generates, using a stored response template, a response to the query. In response to determining that an input term in the query shares a definition with a template term in the response, the NLUI application replaces the template term in the generated response with the input term and generates a modified template based on the stored response template. The NLUI application replaces the template term in the modified template with the input term. The modified template may be stored in the memory of a media device or server for future use and the modified response is outputted by the NLUI application. It should be noted that the modified template may be generated before, after, or during the output of the modified response.

Determining whether an input term should replace a template term involves determining whether the two terms are synonyms or have similar definitions. For example, the NLUI application retrieves a definition of the input term and a definition of the template term from a database of definitions. These definitions may be text strings. The NLUI application compares the respective definitions and in response to identifying a match, determines that the input term shares the definition with the template term. Thus, the input term can replace the template term in the response or stored response templates.

Understandably, people use different synonyms at different times and occasions. Some embodiments disclosed herein keep a record of the different terms used by a user and the frequency with which those terms are used. In these embodiments, the NLUI application generates and updates a vocabulary database. The vocabulary database includes terms that the NLUI application uses when responding to user queries. When a user recites an input term that is not included in the vocabulary database, the NLUI application determines whether the input term is a synonym of a template term by comparing the respective definitions or based on a record of synonyms (e.g., a thesaurus). In response to determining that the input term is a synonym of a template term in the vocabulary database, the NLUI application creates an entry in the vocabulary database for the input term, tracks the number of times the input term was used, and also creates a link (e.g., a pointer) between the template term and input term to signify the commonality in definition. Because the NLUI application tracks, via the vocabulary database, the number of times a term was used by a user, when determining how to replace a template term in a modified template or generated response, in some embodiments, the NLUI application selects an input term that is used most frequently out of the terms linked with the template term as the replacement term.

By learning the user's vocabulary, the NLUI application can incorporate input terms that the user has previously used in various responses that normally include template terms. In one embodiment, the NLUI application receives a second query that does not include the input term. The second query may be received subsequent to the query discussed previously. When generating a response to the second query, the NLUI application selects a respective modified template that answers the second query and includes the input term (i.e., in place of a template term that shares a definition with the input term). Based on the respective modified template, the NLUI application generates a response that includes an input term used in previously received user queries. In some embodiments, the NLUI application generates a response to the query based on a stored response template and replaces template terms in the generated response with interchangeable input terms in the vocabulary database.

In some embodiments, when a response to a query cannot be generated (e.g., a response template for the particular query cannot be found in the response template database or the NLUI application cannot interpret an input term), the NLUI application outputs an appropriate indication such as an error message. The NLUI application may subsequently receive a modified version of the query (e.g., the query is rephrased by the user). The NLUI application determines whether the modified version of the query is similar to the query previously received and whether the unrecognizable input term has been replaced with a template term. In response to determining that the modified version of the query includes a recognizable template term (e.g., a term in the vocabulary database), the NLUI application determines that the previously detected unrecognizable input term shares a definition with the recognizable template term.

The NLUI application may be used by multiple users, requiring a personalized vocabulary database for each different user. A term that one user often says may be a term that another user seldom uses. Accordingly, the NLUI application may receive a query and, in some embodiments, identify a second user who provided the query. In response to determining that the second user is different from the first user (e.g., using voice recognition or user profile information), the NLUI application generates a response to the query based on the stored response template. As the stored response template includes the template term, the output response will include the template term. Alternatively, the NLUI application may identify, based on the vocabulary database, input terms used previously by the second user and output a response including the second user's relevant input term(s).

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative example of query parsing and response templates, in accordance with some embodiments of the disclosure;

FIG. 3 shows an illustrative example for replacing an input term with a template term, in accordance with some embodiments of the disclosure;

DETAILED DESCRIPTION

Figure 1:
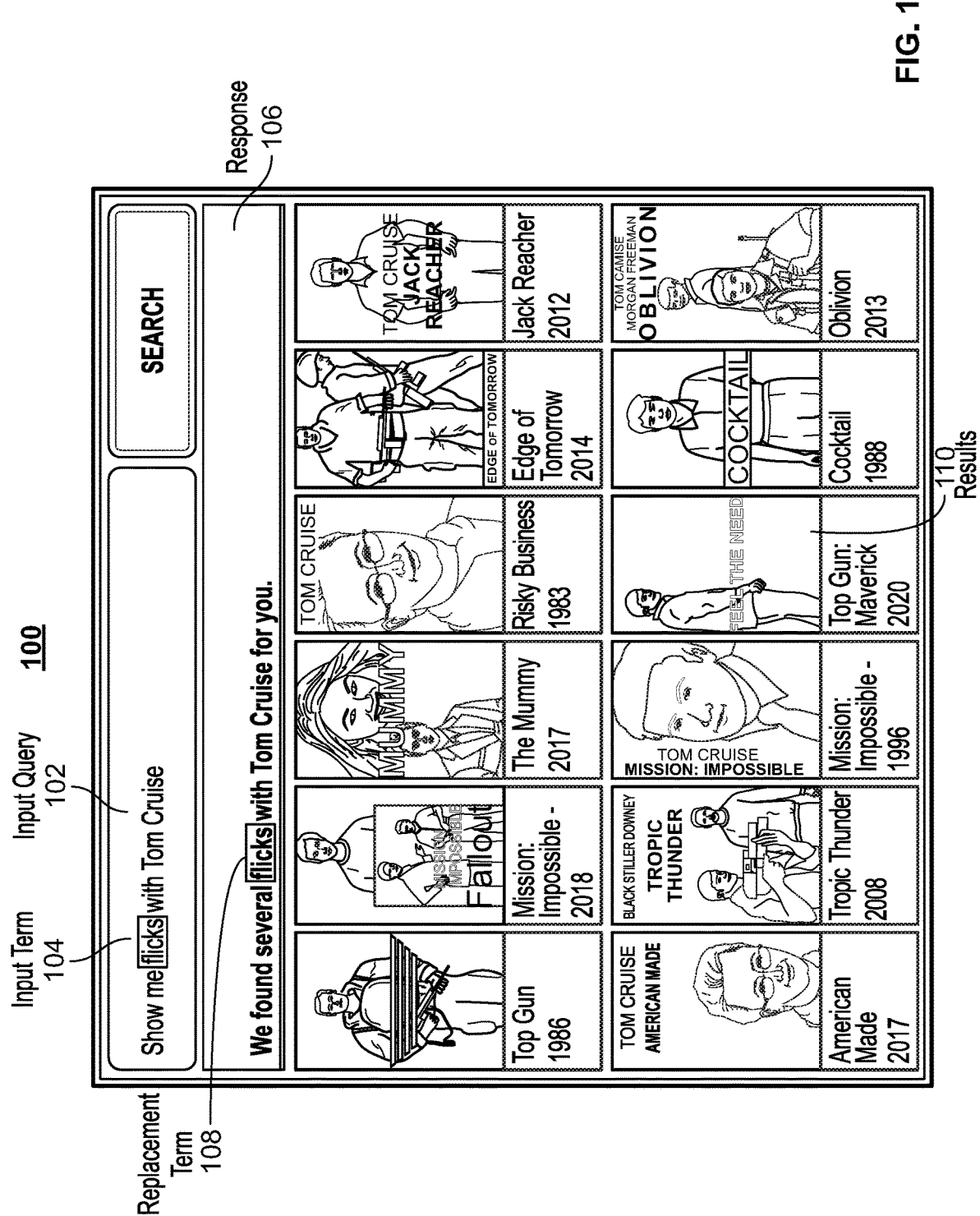
FIG. 1 shows an illustrative example of a natural-language user interface that provides a personalized answer to a user's query using a learned query term, in accordance with some embodiments of the disclosure.

FIG. 1 shows an illustrative example of natural-language user interface 100 (henceforth NLUI 100) that provides a personalized answer to a user's query using a learned query term, in accordance with some embodiments of the disclosure. NLUI 100 may be an interface for an AI virtual assistant (e.g., Google Assistant™), a search-based application, a database search application (e.g., Amazon Prime™ UI), or any application that provides targeted answers to an input query. Input query 102 represents a user command/question that can be provided verbally, through typing, through clickable selections, etc. In FIG. 1, input query 102 is a command stating, "Show me flicks with Tom Cruise." In response to receiving this query, NLUI 100 outputs response 106 "We found several flicks with Tom Cruise for you" and results 110 featuring posters of movies featuring Tom Cruise. In order to fully appreciate how response 106 is generated by NLUI 100, FIG. 2 and FIG. 3 should be considered. FIG. 2 shows illustrative example 200 depicting query parsing and response templates, in accordance with some embodiments of the disclosure. Input query 102 is labeled input query 202 in FIG. 2. Using natural language processing, NLUI 100 parses input query 202 to determine what the user is asking and how to respond. Display action 204 is a command "Show me," that indicates that NLUI 100 should generate, for display, requested data (e.g., images). Requested information 206 represents the output that the user is requesting. In this example, the user is requesting flicks. Information modifier 208 represents clarifications or filters that the user adds in relation to requested information 206. In this example, the user specifically wants see flicks including Tom Cruise. NLUI 100 may refer to a response templates database to retrieve a template that best answers the user query. Because of the potentially large size of the database, NLUI 100 may use indexing for efficient data lookups. For example, in response to parsing display action 204, NLUI 100 may search only portions of the database associated with displaying images, videos, and text (e.g., skip looking up response templates in a "Play a" or "Tell me" action category). NLUI 100 may identify multiple response templates that can be used to answer the user query. Response templates 210 represent potential candidates for generating response 106. The template responses may be ranked by NLUI 100 in order of relevance, as determined by natural language processing techniques. The top template in response templates 210, for example, is "We found several movies with <information modifier> for you."

It should be noted that even though the term "flicks" is used in response template 106, the templates in response templates 210 use the term "movies" instead of "flicks." Input term 104 may not be a word in the response templates database. Accordingly, NLUI 100 determines whether input term 104 has a definition similar to the definition of a template term in the templates of the response templates database. Identifying a similar definition between two terms enables NLUI 100 to select the relevant response template to use when generating a response to the query (e.g., select a response template associated with movies), and allows NLUI 100 to replace the template term with the input term. FIG. 3 shows illustrative example 300 for replacing an input term with a template term, in accordance with some embodiments of the disclosure. Input term 104 is labelled input term 302 in FIG. 3. Template term 304 "movies" is derived from response templates 210 in FIG. 2. In the example, NLUI 100 determines that the respective singular versions of the terms "flicks" and "movies" are synonyms and share the definition "a motion picture," depicted as definition 306. It should be noted that the phrase "shares a definition" refers to having matching or similar definitions. In this example, the definition of "flick" is "a motion picture" and the definition of "movie" is "a motion picture." The respective individual definitions match and this match is phrased as "sharing a definition." Definitions do not necessarily need to match precisely in order to be considered as "shared." This is further described in the description of FIG. 16.

In response to determining that input query 102 includes input term 104, which shares definition 306 with template term 304 (i.e., the respective terms are synonyms), NLUI 100 generates a modified template. This modified template may have the same terms and sentence structure as the stored response template, but the template term in the modified template is specifically replaced with input term 104. Depicted in modified response templates 308, the modified template reads, "We found several flicks with <Information Modifier> for you." NLUI 100 then generates and outputs response 106 "We found several flicks with Tom Cruise for you" based on this modified template. As a result, response 106 contains input term 104 "flicks" in place of the template term "movies" found in response templates 210. NLUI 100 may proceed to replace all occurrences of the template term "movies" with input term 104 (e.g., the other templates of response templates 210 have been modified to recite "flicks" instead of "movies" in modified response template 308).

In some embodiments, rather than generating a response based on modified response templates 308, NLUI 100 generates a response based on response templates 210. For example, NLUI 100 generates a response "We found several movies with Tom Cruise for you." In response to determining that input term 104 shares definition 306 with template term 304, NLUI 100 identifies input term 104 as a replacement term of template term 304. NLUI 100 then modifies the generated response by replacing the template term "movies" in the generated response with replacement term 108 "flicks." The generated modified response is outputted by NLUI 100 as response 106. In some embodiments, NLUI 100 may also replace the term "movies" by replacement term 108 "flicks" in results 110. Doing so makes results 110 and response 106 more accessible and personalized, ensuring that the user can comprehend the response.

Figure 4:
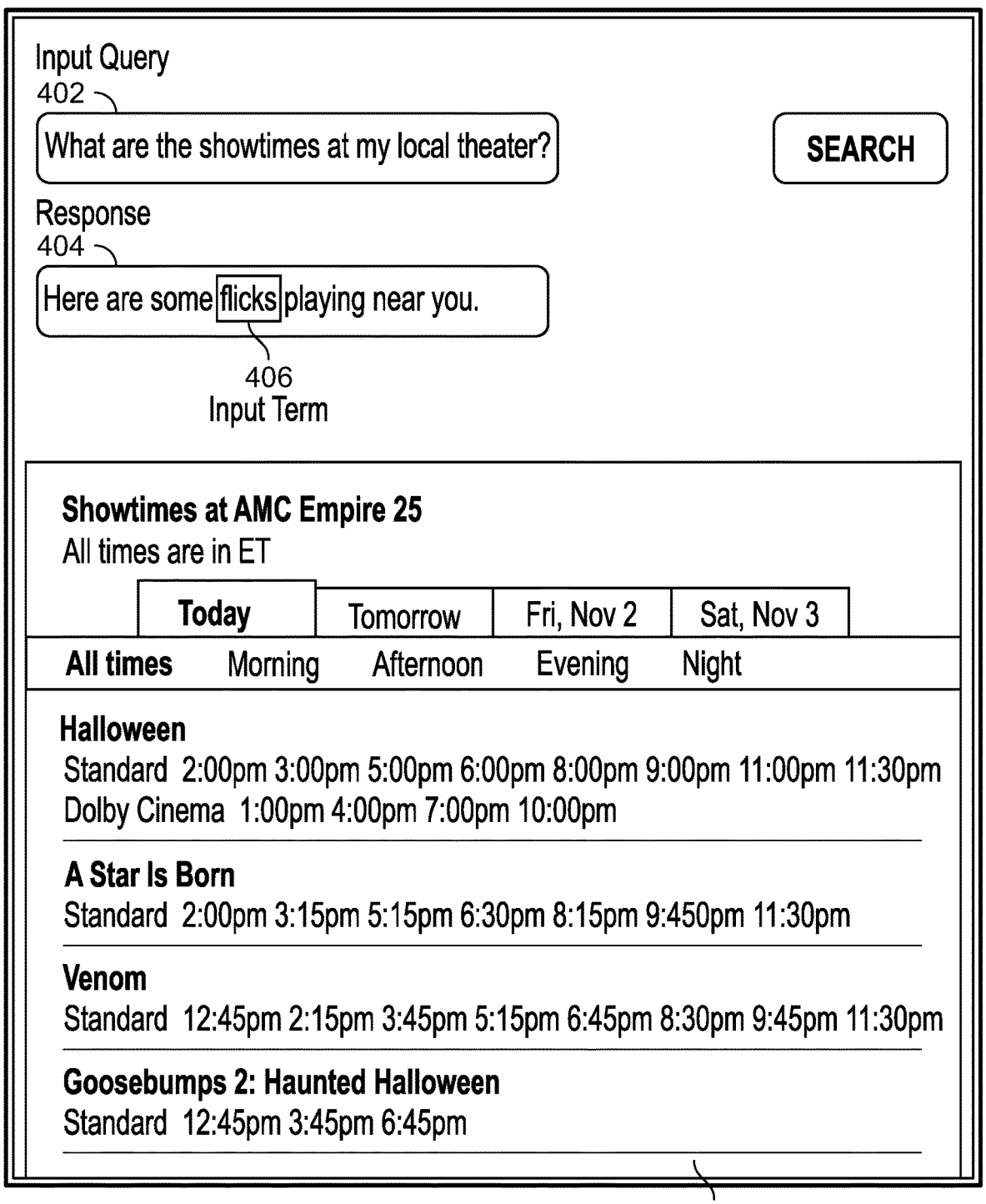
FIG. 4 shows an illustrative example in which a natural-language user interface provides an answer comprising a learned input term from previous user queries, in accordance with some embodiments of the disclosure.

It should be noted that input term 104 appearing in response 106 is not due to a simple regurgitation of input query 102. In other words, some approaches may simply reorganize an input query when creating a response. Such approaches are deficient because they do not adjust how the NLUI application responds to queries in which the input term is not used. In contrast, NLUI 100 replaces template terms from response templates programmed by a developer with input terms appearing in user queries. NLUI 100 adapts its own response templates and/or vocabulary database, rather than providing isolated paraphrased input queries as responses. As an example of this adapting process, FIG. 4 shows illustrative example 400 in which NLUI 100 provides an answer comprising a learned input term from previous user queries, in accordance with some embodiments of the disclosure. Input query 402 may be received by NLUI 100 after receiving input query 102. Input query 402 states, "What are the showtimes at my local theater?" NLUI 100 may parse input query 402 to determine that the user is asking about movie screening times at the user's nearby movie theater. Although input query 402 does not include input term 104 "flicks," because NLUI 100 has generated modified response templates 308 featuring "flicks" as a replacement term for "movies," NLUI 100 may answer input query 402 with "Here are some flicks playing near you." Here, input term 102 appears as input term 406 in response 404. Had input term 104 "flicks" not existed in input query 102, NLUI 100 may have replied with "Here are some movies playing near you," as listed in the original response templates 210. NLUI 100 then outputs results 408 and response 404.

Figure 5:
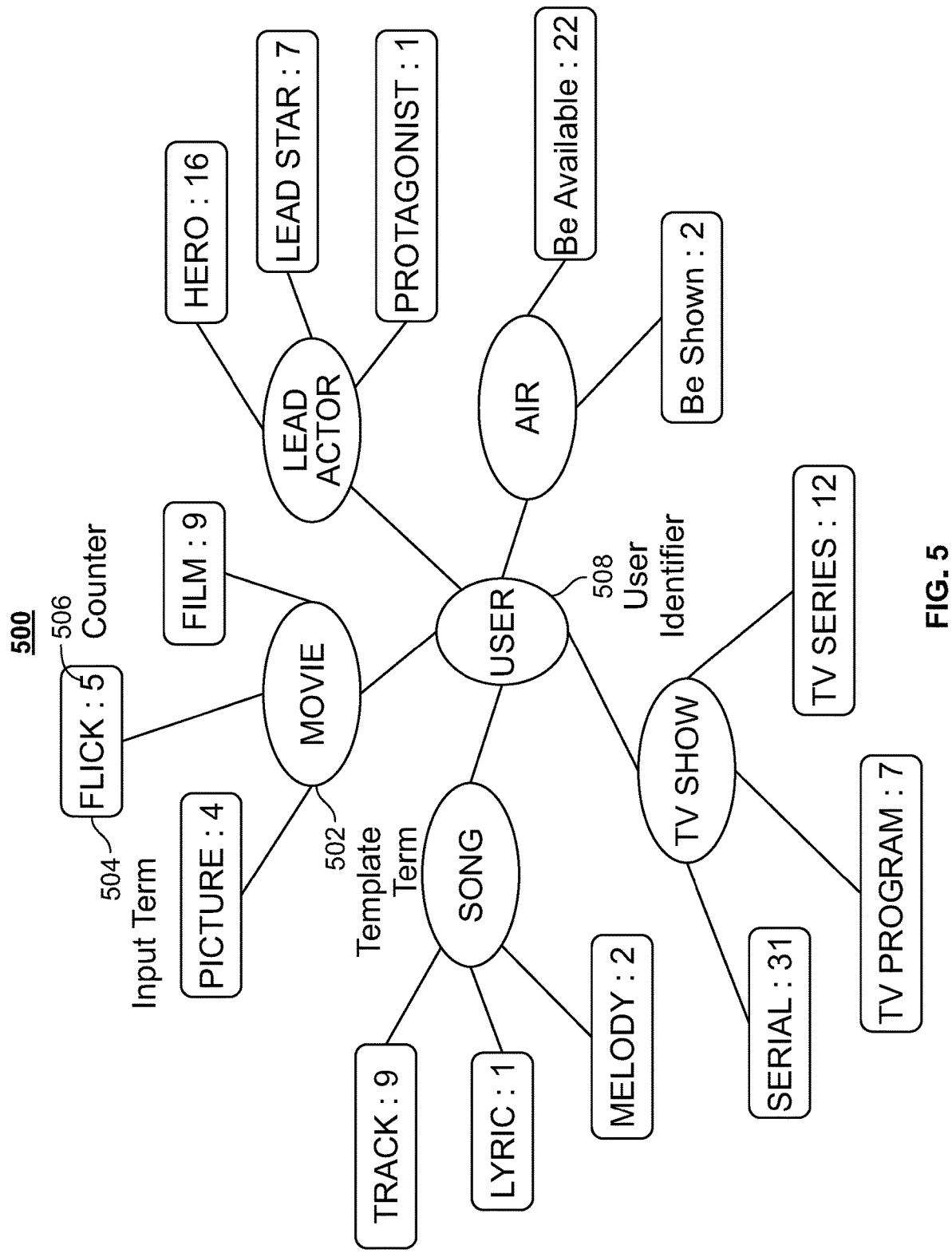
FIG. 5 shows a diagram of template terms that are connected with various terms of a vocabulary database, in accordance with some embodiments of the disclosure.

In some embodiments, NLUI 100 adds "flicks" to a vocabulary database as a replacement term of the template term "movies." The vocabulary database may be a data structure such as an array or linked list. FIG. 5 shows diagram 500 of template terms that are connected with various terms of a vocabulary database, in accordance with some embodiments of the disclosure. Template term 502 "movie" is depicted in an oval, alongside other template terms: "song," "lead actor," "tv show," and "air." These template terms may be stored in a vocabulary database, which includes the terms that NLUI 100 uses to generate responses to queries. Input term 504 "flick" is depicted in a rectangle, alongside other input terms (e.g., "picture," "film," "hero," "lead star," etc.) that the user may have used in previous queries. In FIG. 5, the input terms that share a definition with a particular template term are visually connected. For example, "picture," "flick," and "film" are connected to the template term "movie" because the three terms are determined to be synonyms of "movie." NLUI 100 may generate new entries in the vocabulary database with these three words and may add pointers or index values, which point to the new generated entries, to the entry of the template term "movie." When performing a lookup of replacement terms for template term 502, NLUI 100 retrieves the index values and pointers in the entry of template term 502. The retrieved index values and/or pointers may direct NLUI 100 to input term 504.

In some embodiments, NLUI 100 monitors the number of times an input term is used and stores the counter values in the vocabulary database. For example, counter 506 represents the number of times input term 504 was presented in all queries received by NLUI 100. Counter 506 may also be the number of queries, of all queries received by NLUI 100, that included input term 504. Revisiting example 400 of FIG. 4, in response to receiving input query 402, NLUI 100 may generate a response such as, "Here are some movies playing near you," based on the original response templates 210. NLUI 100 may then retrieve a replacement term for the template term "movies" from the vocabulary database. In particular, the NLUI may identify the input term linked with the template term "movie" that is used the most by the user. Based on FIG. 5, the input term linked with "movie" that is most used is "film." Thus, NLUI 100 may generate response 404 such that it states, "Here are some films playing near you."

FIG. 5 also includes user identifier 508. This indicates that NLUI 100 may create personalized vocabulary databases with terms that are used specifically by a particular user. User identifier 508 may be a text string, a fingerprint, a login credential to a user profile, or a vocal pattern. For example, if the user is performing a query while logged in to his/her user profile, NLUI 100 may retrieve a vocabulary database associated with that particular user profile.

Figure 6A:
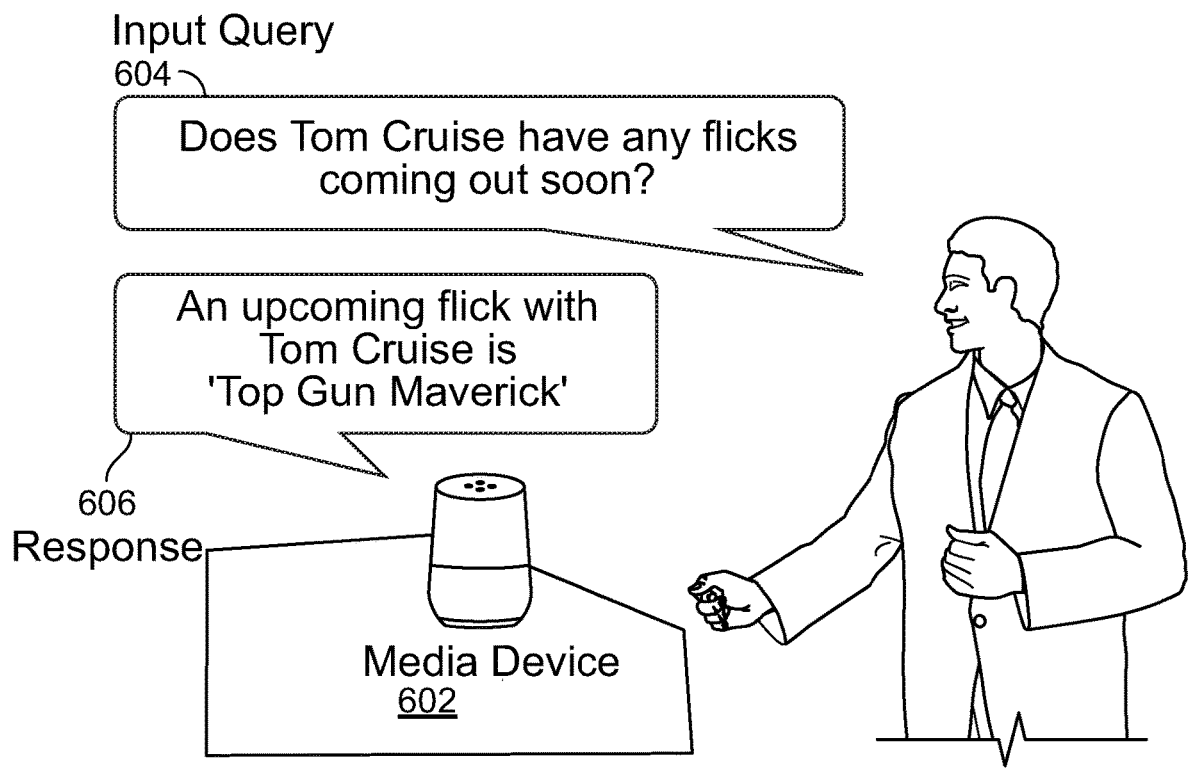
FIG. 6A shows an illustrative dialogue between a user and a smart speaker implementing the nature-language user interface application, in accordance with some embodiments of the disclosure.

FIG. 6A shows illustrative dialogue 600 between a user and media device 602 (e.g., a smart speaker) implementing the nature-language user interface application, in accordance with some embodiments of the disclosure. In FIG. 1, NLUI 100 is only presented as a visual interface. However, the NLUI application may also be implemented as an audio-based user interface. In illustrative dialogue 600, media device 602 receives input query 604 from the user, stating, "Does Tom Cruise have any flicks coming out soon?" The input term is "flicks." The NLUI application determines that the input query is answered by a stored response template stating, "An upcoming movie with <information modifier> is <result>." The template term "movie" is further determined by the NLUI application to share a definition with the input term "flick." In response to determining that the respective terms have similar definitions, the NLUI application may generate a modified template reciting, "An upcoming flick with <information modifier> is <result>" and/or generate a response based on the stored response template while ultimately replacing the template term with the input term in the generated response. In the former, the NLUI may generate a modified template of all stored response templates that include the template term. The audio output from the NLUI application in media device 602 is response 606 "An upcoming flick with Tom Cruise is 'Top Gun Maverick.'"

Figure 6B:
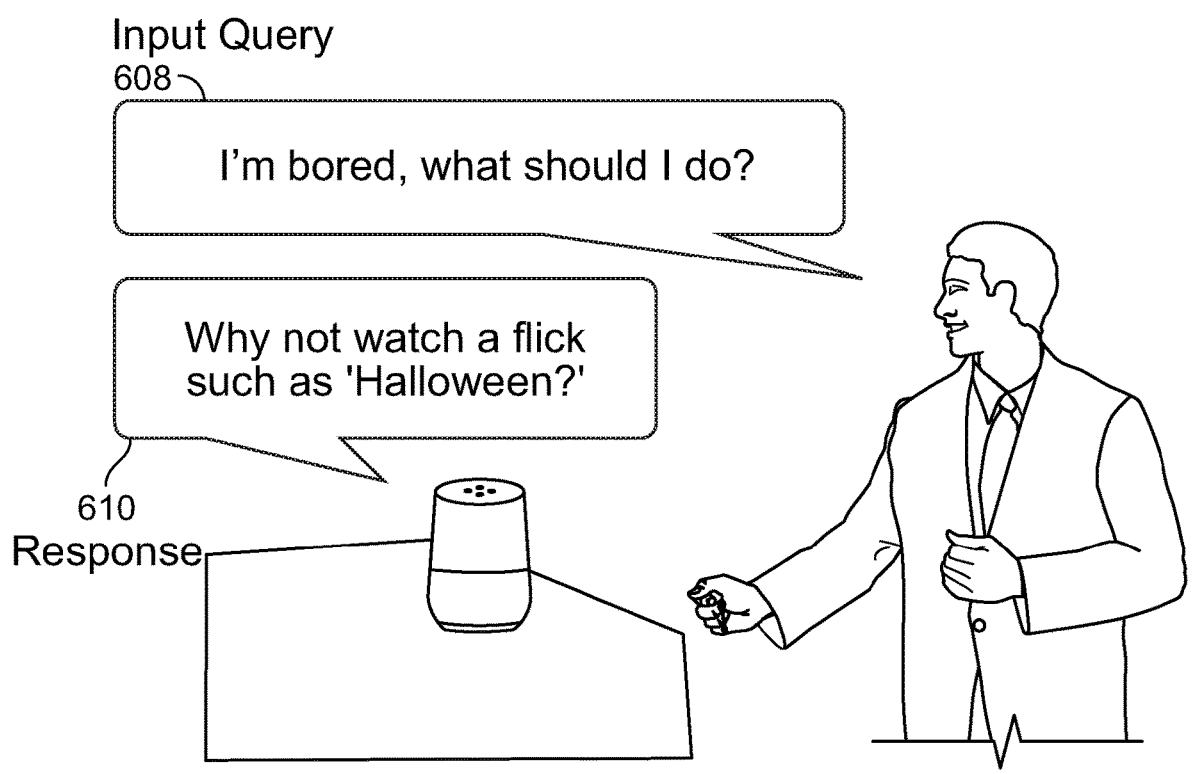
FIG. 6B shows an illustrative dialogue between the user and the smart speaker where the smart speaker responds to a user query with an input term used in a previous user query, in accordance with some embodiments of the disclosure.

FIG. 6B shows illustrative dialogue 608 between the user and media device 602 where media device 602 responds to a user query with an input term used in a previous user query, in accordance with some embodiments of the disclosure. In FIG. 6A, the NLUI application may have created modified templates for all stored response templates including the template term "movie." The modified templates may have the template term "movie" replaced with "flick." Accordingly, in illustrative dialogue 608, when receiving input query 608 "I'm bored, what should I do?" the NLUI application may generate a response based on a modified template. Response 610 by media device 602 is "Why not watch a flick such as 'Halloween'?" The term "flick" represents a replacement term of a template term such as "movie" (i.e., the original response template may have been "Why not watch a movie such as 'Halloween'?"). If a modified template does not exist to respond to input query 608, the NLUI application generates a response based on an appropriate stored response template (e.g., "Why not watch a movie such as <recommended movie>?") and then replaces the template term "movie" with an input term from the vocabulary database discussed in FIG. 5. For example, the NLUI application may generate the response "Why not watch a movie such as 'Halloween'?" and modify the response to read, "Why not watch a flick such as 'Halloween'?" The NLUI application outputs the modified response on media device 602.

Figure 7:
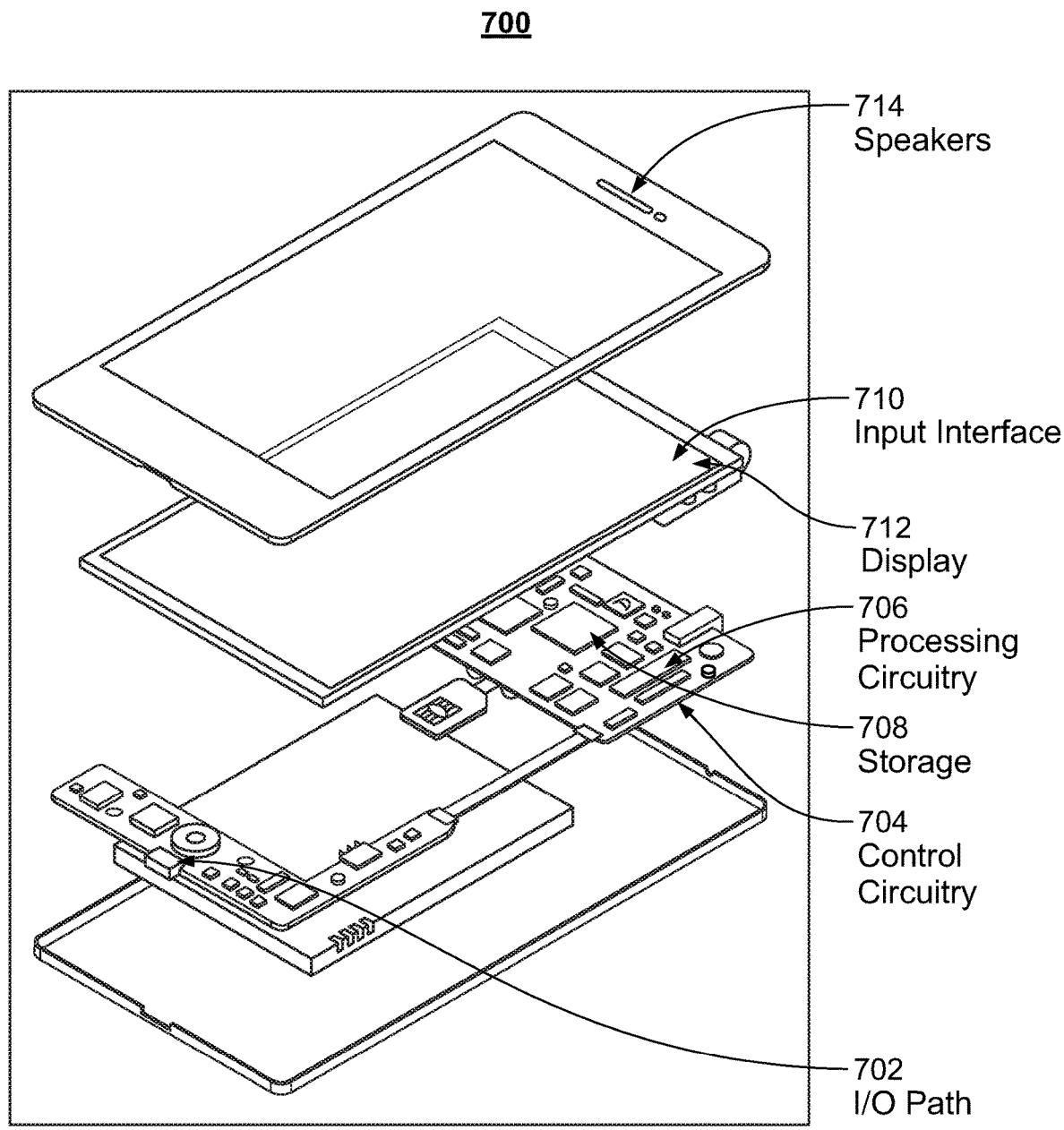
FIG. 7 is a diagram of an illustrative media device in accordance with some embodiments of the disclosure.

FIG. 7 shows a generalized embodiment of illustrative media device 700. As referred to herein, the phrase "media device" should be understood to mean any device that can output results to user queries. As depicted in FIG. 7, media device 700 is a smartphone. However, media device 700 is not limited to smartphones and may be any computing device. For example, media device 700 of FIG. 7 can be implemented in system 800 of FIG. 8 as media device 802 (e.g., a smartphone, a video game console, a smart television, a smart speaker, a computer, or any combination thereof).

Media device 700 may receive data via input/output (hereinafter "I/O") path 702. I/O path 702 may provide received data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a NLUI application stored in memory (i.e., storage 708).

A NLUI application may be a stand-alone application implemented on a media device or a server. The NLUI application may be implemented as software or a set of executable instructions. The instructions for performing any of the embodiments discussed herein of the NLUI application may be encoded on non-transitory computer readable media (e.g., a hard drive, random-access memory on a DRAM integrated circuit, read-only memory on a BLU-RAY disk, etc.) or transitory computer readable media (e.g., propagating signals carrying data and/or instructions). For example, in FIG. 7 the instructions may be stored in storage 708 and executed by control circuitry 704 of a media device 700.

In some embodiments, a NLUI application may be a client-server application where only the client application resides on media device 700 (e.g., media device 802), and a server application resides on an external server (e.g., server 806). For example, a NLUI application may be implemented partially as a client application on control circuitry 704 of media device 700 and partially on server 806 as a server application running on control circuitry of server 806. Server 806 may be a part of a local area network with media device 802 or may be part of a cloud computing environment accessed via the Internet. In a cloud computing environment, various types of computing services for performing searches on the Internet or informational databases, providing storage (e.g., for the vocabulary database) or parsing data are provided by a collection of network-accessible computing and storage resources (e.g., server 806), referred to as "the cloud." Media device 700 may be a cloud client that relies on the cloud computing capabilities from server 806 to generate the personalized answers of the NLUI application. When executed by control circuitry of server 806, the NLUI application may instruct the control circuitry to generate the NLUI application output (e.g., the personalized answer) and transmit the generated output to media device 802. The client application may instruct control circuitry of the receiving media device 802 to generate the NLUI application output. Alternatively, media device 802 may perform all computations locally via control circuitry 704 without relying on server 806.

Control circuitry 704 may include communications circuitry suitable for communicating with a NLUI application server or other networks or servers. The instructions for carrying out the above-mentioned functionality may be stored and executed on server 806. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 806) may be used to supplement storage 708 or instead of storage 708.

A user may send instructions (e.g., search a query) to control circuitry 704 using user input interface 710 of media device 700. User input interface 710 may be any suitable user interface touchscreen, touchpad, stylus and may be responsive to external device add-ons such as a remote control, mouse, trackball, keypad, keyboard, joystick, voice recognition interface, or other user input interfaces. Display 710 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Speakers 714 may be provided as integrated with other elements of user equipment device 700 or may be stand-alone units. An audio component of the personalized answer and other content displayed on display 712 may be played through speakers 714. In some embodiments, the audio may be distributed to a receiver (not shown), which processes and outputs the audio via speakers 714.

Control circuitry 704 may allow a user to provide user profile information or may automatically compile user profile information. For example, control circuitry 704 may monitor the words the user inputs in his/her queries. In some embodiments, control circuitry 704 monitors user inputs that are not queries, such as texts, calls, conversation audio, social media posts, etc., to detect input terms that share definitions with template terms in stored response templates. Control circuitry 704 may store the detected input terms in a vocabulary database linked to the user profile. Additionally, control circuitry 704 may obtain all or part of other user profiles that are related to a particular user (e.g., via social media networks), and/or obtain information about the user from other sources that control circuitry 704 may access. As a result, a user can be provided with a unified experience across the user's different media devices.

Figure 8:
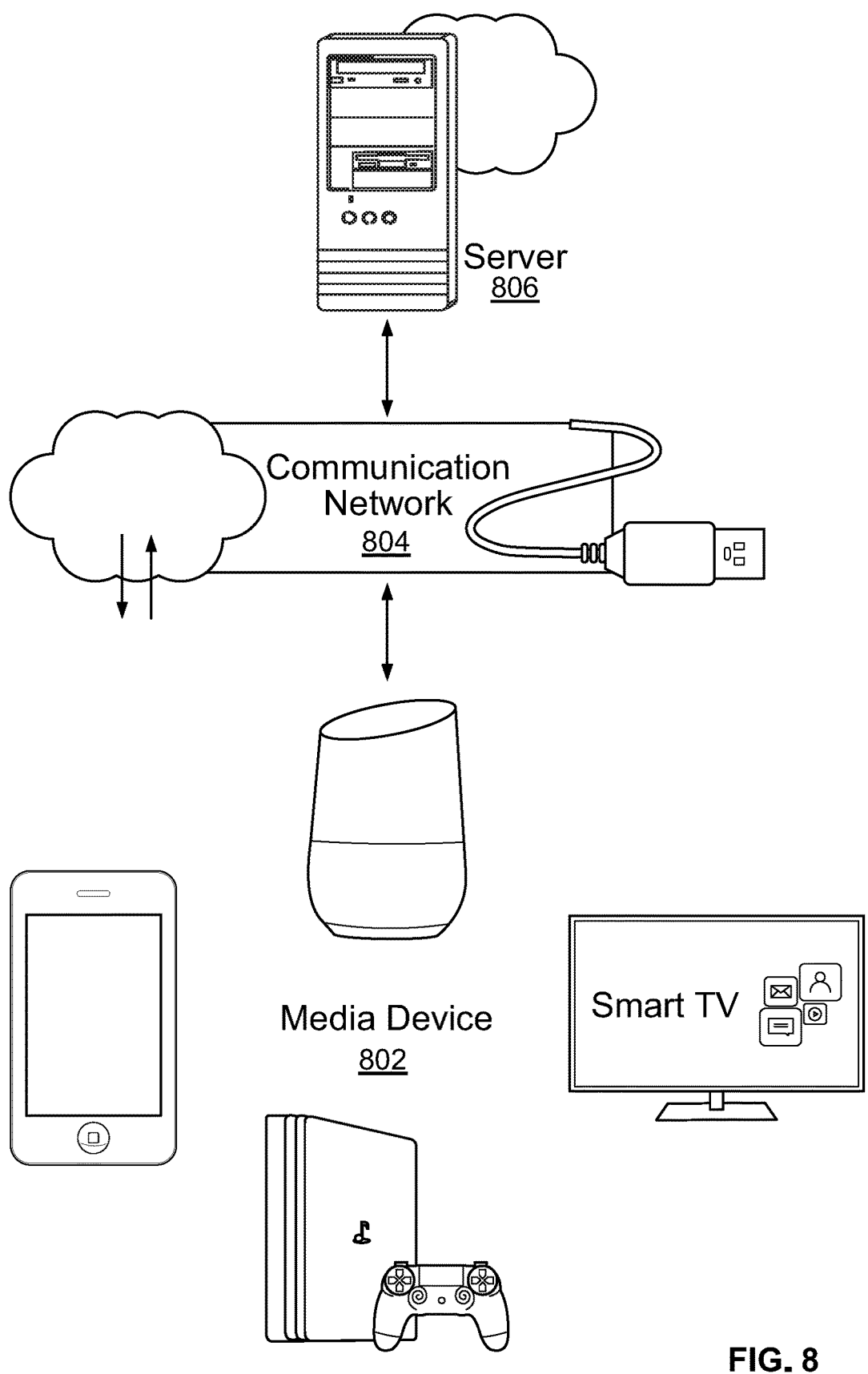
FIG. 8 is a diagram of an illustrative media system in accordance with some embodiments of the disclosure.

As depicted in FIG. 8, media device 802 may be coupled to communication network 804. Communication network 804 may be one or more networks including the Internet, a mobile phone network, mobile voice or data network (e.g., a 4G or LTE network), cable network, public switched telephone network, Bluetooth, or other types of communications network or combinations of communications networks. Thus, media device 802 may communicate with server 806 over communication network 804 via communications circuitry described above. In should be noted that there may be more than one server 806, but only one is shown in FIG. 8 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 9:
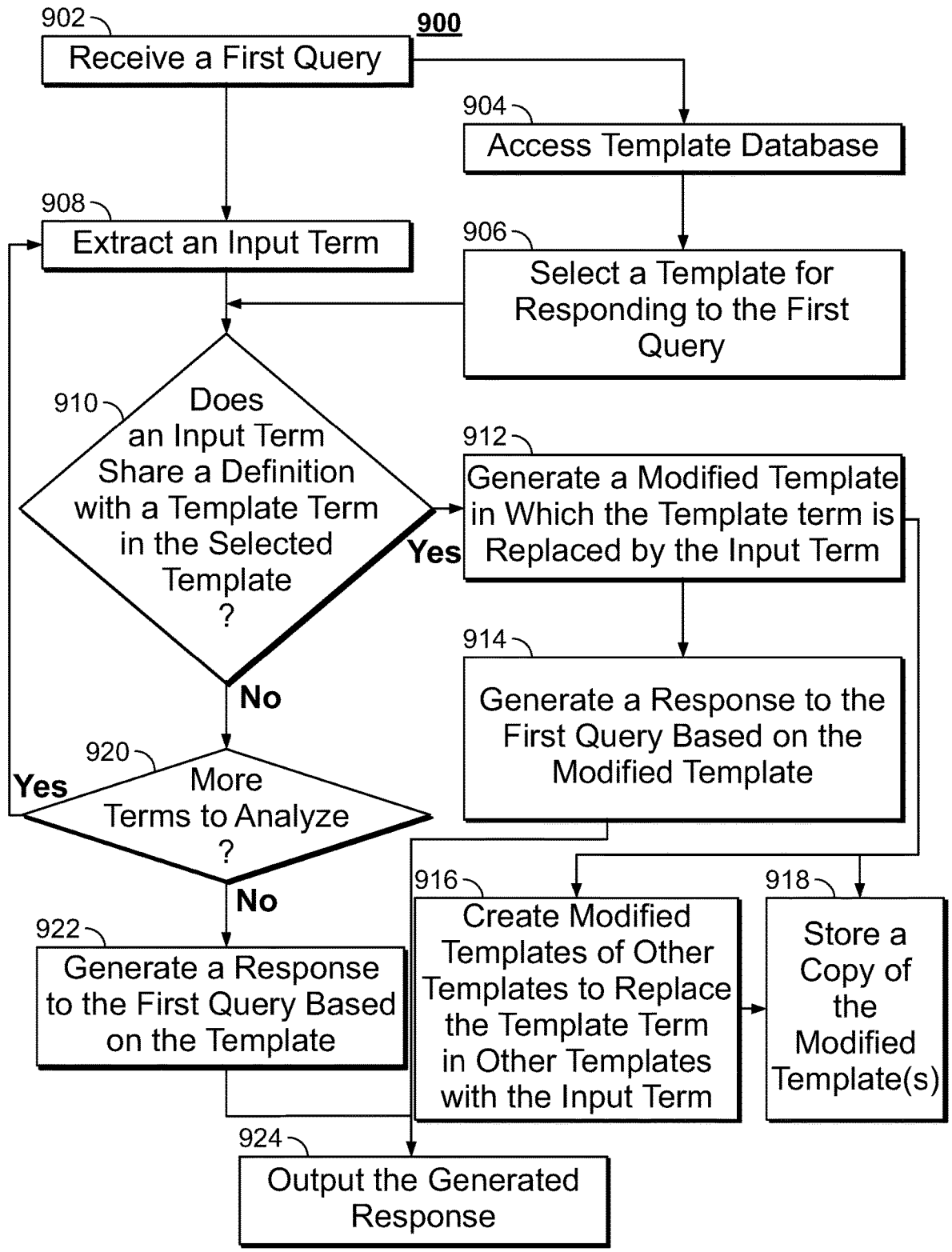
FIG. 9 is a flowchart of a detailed illustrative process for providing a personalized answer to a user's query by generating a modified response template including a learned input term, in accordance with some embodiments of the disclosure.

FIG. 9 is a flowchart of detailed illustrative process 900 for providing a personalized answer to a user's query by generating a modified response template including a learned input term, in accordance with some embodiments of the disclosure. At 902, control circuitry 704 receives a first query via I/O Path 702 on input interface 710 of a media device. For example, the first query may be input query 102 if the media device has a display, or input query 604 if the output of the media device is audio-based. If the first query is a verbal query (e.g., an audio clip received via a microphone), control circuitry 704 converts, using voice recognition, the audio clip of the first query into text. At 902, control circuitry 704 additionally parses the first query to determine how to answer the first query. This process is described in FIG. 2.

At 904, control circuitry 704 accesses a response template database from memory (e.g., storage 708) in order to identify an appropriate response template for answering the first query. For example, input query 102 states, "Show me flicks with Tom Cruise" which is interpreted by control circuitry 704 as a command to display movies starring Tom Cruise. Control circuitry 704 executes a search through the response template database to identify relevant templates that can be used to respond to the user. At 906, control circuitry 704 selects a response template for responding to the first query. For example, control circuitry 704 may select the response template "We found several movies with <information modifier> for you."

At 908, control circuitry 704 extracts an input term. The first query includes six terms: "show," "me," "flicks," "with," "Tom," and "Cruise." When parsing the first query, control circuitry 704 may consider each term as an input term. At 910, control circuitry 704 determines whether an input term shares a definition with a template term in the selected template for responding to the first query. For example, control circuitry 704 compares the definition of the first term "show" with the definitions of all terms in the selected template (e.g., "we," "found," "several," etc.). Control circuitry 704 may retrieve the definitions from the Internet or a digital dictionary stored in storage 708 (e.g., on media device 802 and/or server 806). Control circuitry 704 may also determine whether the input term appears in an online and/or local digital dictionary as a synonym of any terms in the selected template. The processes for determining whether an input term shares a definition with a template term are further described in FIG. 12 and FIG. 16. In response to determining that the input term "show" does not share a definition with any template term in the selected response template, process 900 may advance to 920, where control circuitry 704 determines whether there are more terms in the first query to analyze. In this example, four input terms remain for analysis. Thus, in response to determining that there are additional input terms to analyze, process 900 returns to 908 where control circuitry 704 extracts the term "me." This loop between 908, 910, and 920 continues until all input terms are analyzed.

At 910, control circuitry 704 may also determine that the input term does share a definition with a template term. For example, after extracting the term "flicks" from the first query, at 910, control circuitry 704 may compare the definitions of "flicks" and the template term "movies." In response to determining that the respective terms have similar definitions "a motion picture," at 912, control circuitry 704 generates a modified template in which the template term is replaced by the input term. For example, control circuitry 704 generates a new template "We found several movies with <information modifier> for you" and replaces the term "movies" in the new template with "flicks." The generated modified template thus reads, "We found several flicks with <information modifier> for you."

At 914, control circuitry 704 generates a response to the first query based on the modified template. As discussed in FIG. 2, when parsing the first query in 902, control circuitry 704 may categorize each term of the input query (e.g., as display action 204, requested information 206, information modifier 208, etc.). The modified template features a field in which the "information modifier" string from the input query should be inserted. The input query specifically requests movies with Tom Cruise. Accordingly, control circuitry 704 inserts the text string "Tom Cruise" into the information modifier field of the modified template. Once all fields of a response template are filled by the required information, the control circuitry 704 will have generated a response. In this example, control circuitry 704 generates a response stating, "We found several flicks with Tom Cruise for you."

From 912, process 900 may proceed to 916 or 918 or both 916 and 918. For example, at 916, control circuitry 704 creates modified templates of other stored response templates to replace the template term (e.g., "movies") in the other response templates with the input term ("flicks"). At 918, control circuitry 704 stores in memory (e.g., storage 708) a copy of each modified template generated at 912 and 916.

In the event that there are no input terms that share a definition with a template term of the selected template, control circuitry 704 may determine whether there is a template term from any of the stored response templates that share a definition with the input term. For example, there may be a response template that includes the term "movie" and is not the selected template. Control circuitry 704 generates modified templates for those specific response templates with the template term and stores them in memory (e.g., storage 708).

At 920, if control circuitry 704 determines that there are no more terms to analyze and no input terms match a template term, process 900 advances to 922 where control circuitry 704 generates a response to the first query based on the selected template. In this case, a modified template is not generated for the selected template. Referring to the overarching example, the response may be "We found several movies with Tom Cruise for you."

At 924, control circuitry 704 outputs (e.g., via speakers 714, display 712, or a combination thereof), the generated response. If process 900 advanced to 914, where control circuitry 704 generated the response based on the modified template, the outputted response may be "We found several flicks with Tom Cruise for you," as depicted in FIG. 1. If process 900 advanced to 922 instead, control circuitry 704 outputs "We found several movies with Tom Cruise for you."

It should be noted that control circuitry 704 may detect multiple input terms that share definitions with respective template terms in the selected response template. In response, control circuitry 704 generates a modified response template based on the selected response template and makes multiple replacements (i.e., replace each input term with the corresponding template term that shares a definition with the respective input term).

Figure 10:
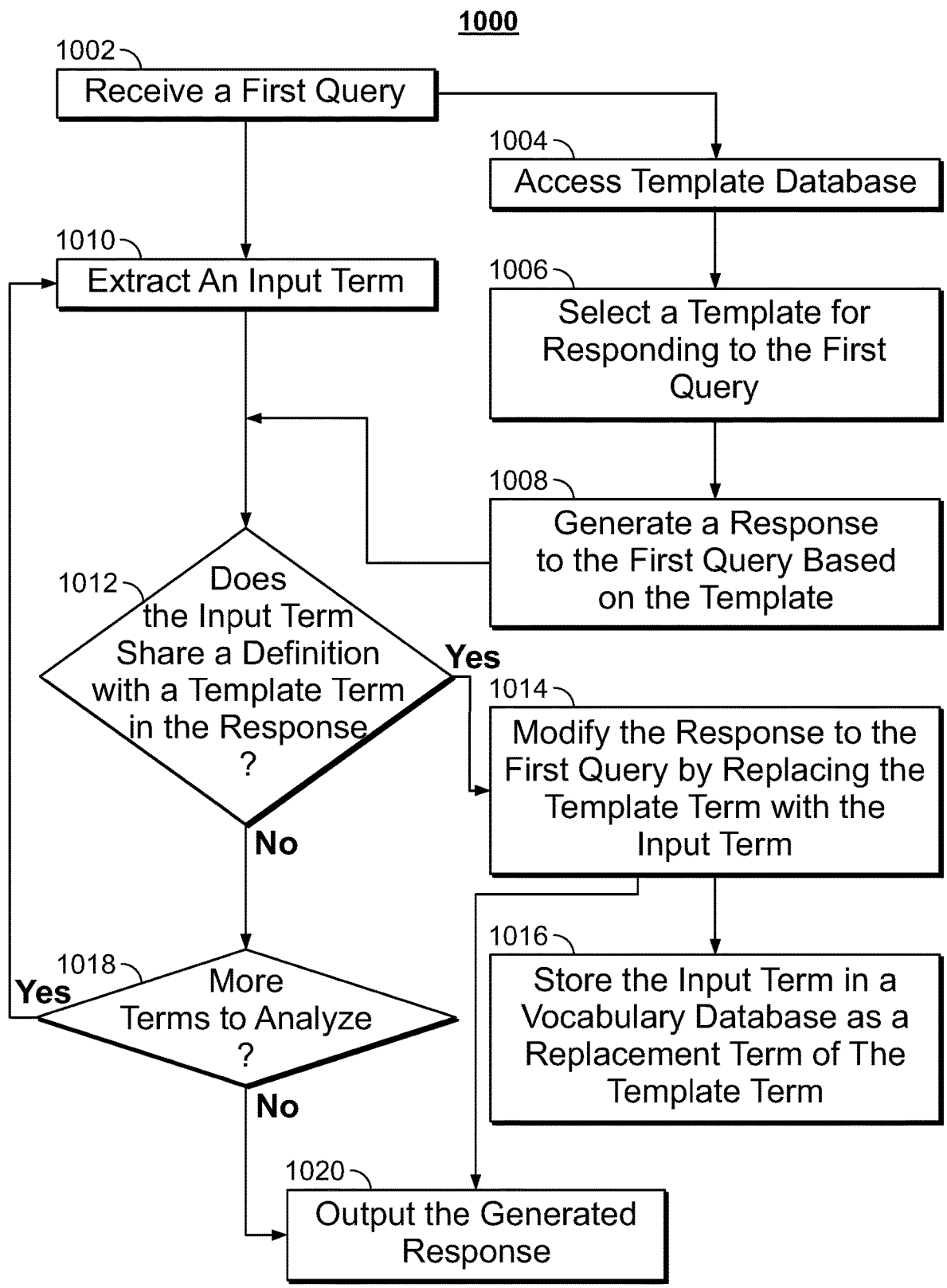
FIG. 10 is a flowchart of an illustrative process for providing a personalized answer to a user's query by modifying the answer to include a learned input term, in accordance with some embodiments of the disclosure.

FIG. 10 is a flowchart of illustrative process 1000 for providing a personalized answer to a user's query by modifying the answer to include a learned input term, in accordance with some embodiments of the disclosure. Process 1000 begins at 1002, where control circuitry 704 receives a first query. Suppose that the first query is input query 604 "Does Tom Cruise have any flicks coming out soon?". At 1004, control circuitry 704 accesses the response template database from memory (e.g., storage 708 of media device 802 or server 806). At 1006, control circuitry 704 selects a template for responding to the first query. The selected template is retrieved by control circuitry 704 from the response template database. By employing natural language processing techniques, control circuitry 704 parses the first query (e.g., identifies keywords and grammatical attributes) and determines the response template in the response template database that shares the keywords and grammatical attributes, thus answering the question/command in the first query. In this example, the selected response template may be "an upcoming movie with <information modifier> is <result>." At 1008, control circuitry 704 generates a response to the first query based on the selected template. For example, control circuitry 704 fills in the fields of "information modifier" and "result" (e.g., inserting text strings in the text string of the response template), creating a response that reads, "An upcoming movie with Tom Cruise is 'Top Gun Maverick.'"

At 1010, control circuitry 704 extracts an input term from the first query. As mentioned previously, control circuitry 704 identifies all terms in the first query as input terms. The first input term extracted by control circuitry 704 may be "does." At 1012, control circuitry 704 determines whether the input term shares a definition with a template term in the generated response of 1008. In response to determining that the first input term "does" is not a synonym of any template term in the generated response, at 1018, control circuitry 704 determines whether there are additional terms to analyze. In response to determining that there are additional terms to analyze (e.g., "Tom," "Cruise," "flicks," etc.), process 1000 returns to 1010, where control circuitry 704 extracts the next input term. In this example, the loop between 1010, 1012 and 1018 may continue until control circuitry 704 extracts the term "flicks." At 1012, control circuitry 704 thus determines that the input term "flicks" shares a definition with the template term "movie."

In response to determining that an input term shares a definition with a template term, at 1014 control circuitry 704 modifies the response to the first query (i.e., the generated response of 1008) by replacing the template term with the input term. For example, control circuitry 704 replaces the term "movie" in the generated response with "flick." Thus, the modified response reads, "An upcoming flick with Tom Cruise is 'Top Gun Maverick.'" At 1016, control circuitry 704 stores the input term in a vocabulary database (e.g., in storage 708 of media device 802 or server 806) as a replacement term of the template term. The vocabulary data is discussed in further detail in the description of FIG. 5. If control circuitry 704 determines that the term already exists the in the vocabulary database, control circuitry 704 increments, in the entry of the input term in the vocabulary database, the number of times the input term was used. It should be noted that control circuitry 704 may identify multiple input terms that share definitions with template terms in the generated response.

Accordingly, control circuitry 704 replaces the respective template terms that share a definition with the corresponding the input term.

At 1020, control circuitry 704 outputs (e.g., via speakers 714, display 712, or a combination thereof) the generated response. If the generated response of 1008 was modified by control circuitry 704 at 1014, control circuitry 704 outputs the modified response. FIG. 6A depicts an example of control circuitry 704 outputting a modified response. If control circuitry 704 determines, based on 1012 and 1018, that there are no input terms that share a definition with any template term in the response, at 1020, control circuitry 704 outputs the generated response of 1008.

Figure 11:
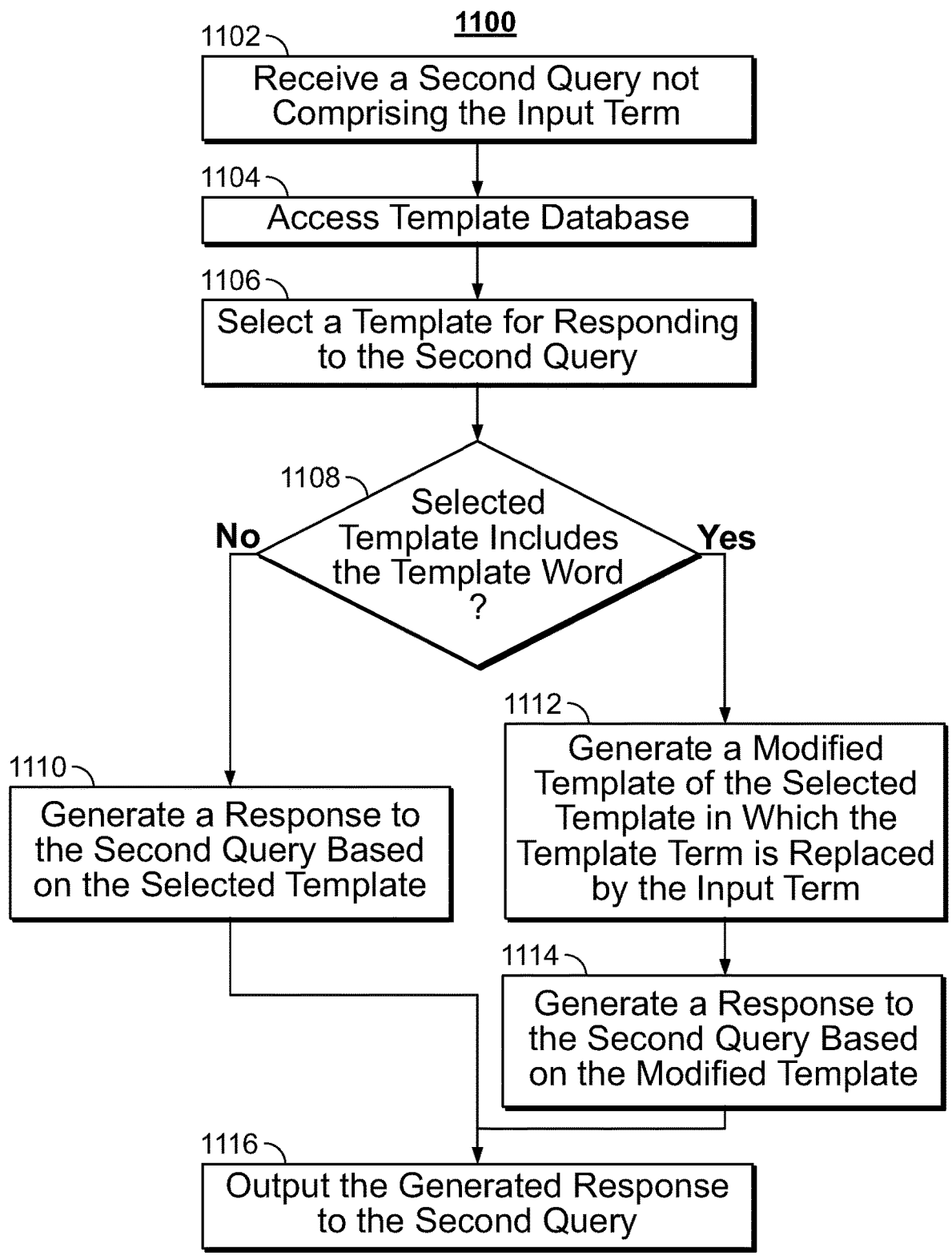
FIG. 11 is a flowchart of an illustrative process for providing a personalized answer to a second query that does not comprise the input term by generating a modified template with the input term, in accordance with some embodiments of the disclosure.

FIG. 11 is a flowchart of illustrative process 1100 for providing a personalized answer to a second query that does not comprise the input term by generating a modified template with the input term, in accordance with some embodiments of the disclosure. Control circuitry 704 may execute process 1100 subsequent to receiving the first query. Specifically, at 1102, control circuitry 704 receives (e.g., via I/O Path 702 of input interface 710) a second query not comprising the input term. Examples of the second query include input query 402 and input query 608. The input term "flicks" is not included in either example. At 1104, control circuitry 704 accesses in memory (e.g., storage 708 of media device 802 or server 806) the response template database. At 1106, control circuitry 704 selects a response template for responding to the second query. Although the second query does not include the input term, control circuitry 704 employs natural language processing techniques to identify a response template that appropriately answers the query. In the case of input query 608, the selected template is "Why not watch a movie such as <movie name>?"

At 1108, control circuitry 704 determines whether the selected template includes a template term that can be replaced with an input term. For example, control circuitry 704 accesses the vocabulary database in memory (e.g., in storage 708 of media device 802 or server 806) and determines whether the template terms in the selected template have linked replacement terms. For example, as depicted in FIG. 5, the template term "movie" can be replaced with the input terms "picture," "flick," or "film." In response to determining that the selected template includes a template term that can be replaced with an input term, at 1112 control circuitry 704 generates a modified template of the selected template in which the template term is replaced by the input term (e.g., "Why not watch a flick such as <movie name>?"). At 1114, control circuitry 704 generates a response to the second query based on the modified template by inserting the movie title into the "movie name" field of the template. In response to determining that the selected template does not include a template term that can be replaced with an input term, at 1110, control circuitry 704 generates a response to the second query based on the selected template (without modifications). At 1116, control circuitry 704 outputs (e.g., via speakers 714, display 712, or a combination thereof) the generated response to the second query. For example, as depicted in FIG. 6, control circuitry 704 outputs, "Why not watch a flick such as 'Halloween?'"

Figure 12:
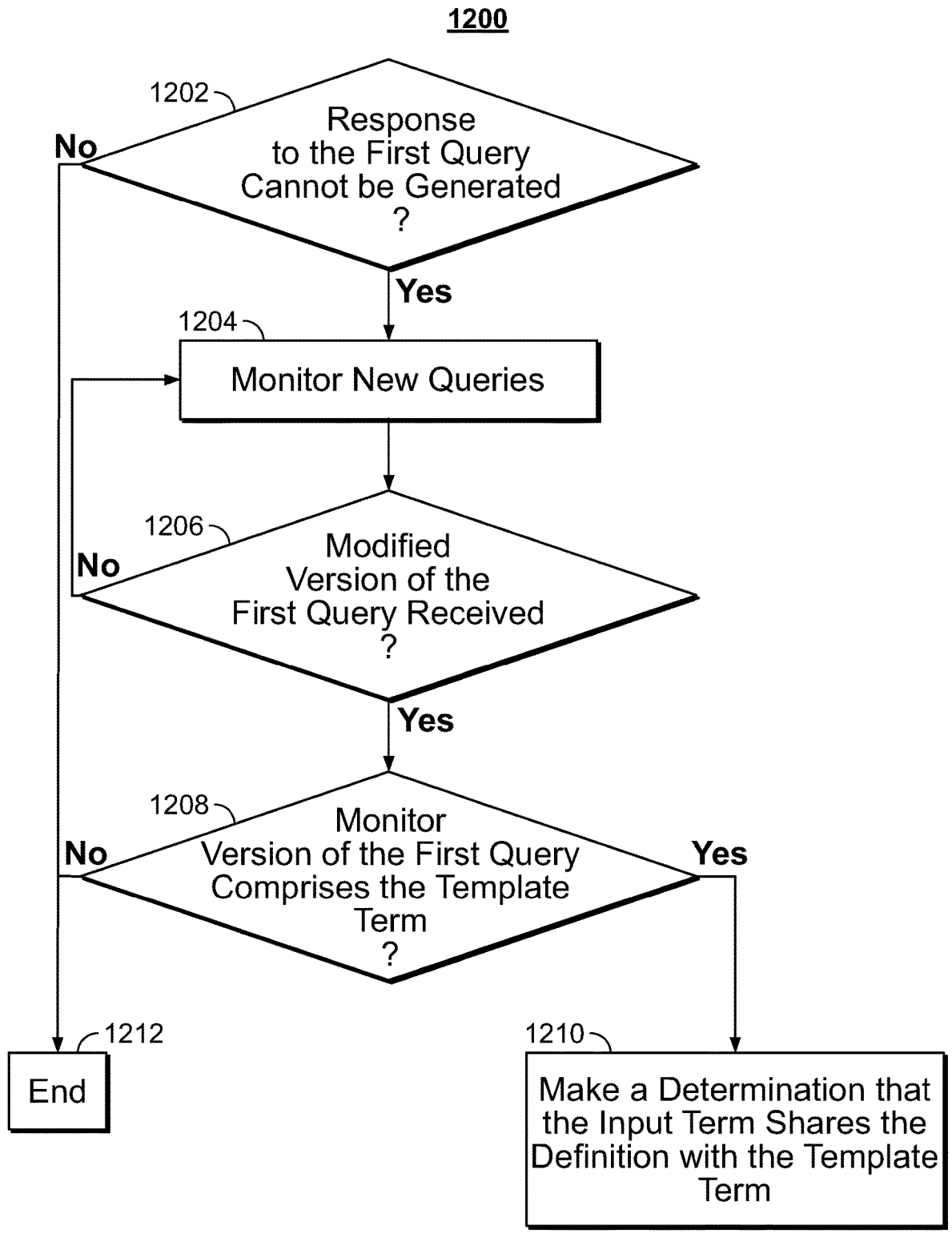
FIG. 12 is a flowchart of an illustrative process for determining whether an input term has a similar definition to the definition of a template term based on a clarifying user query, in accordance with some embodiments of the disclosure.

FIG. 12 is a flowchart of illustrative process 1200 for determining whether an input term and a template term have similar definitions based on a clarifying user query, in accordance with some embodiments of the disclosure. When parsing the input query at 902 or 1002, control circuitry 704 may be unable to determine a template that should be used to respond to the input query. This is further elaborated in process 1200 where at 1202, control circuitry 704 determines whether the response to the first query cannot be generated. For example, the input query may include an input term that control circuitry 704 does not understand (e.g., is not present in the vocabulary database and cannot be defined). In response to determining that the response cannot be generated, control circuitry 704 may generate an error message. For example, in response to receiving the query "Show me flicks with Tom Cruise," control circuitry 704 may output, "Sorry, I do not understand." At 1204, control circuitry 704 monitors for new queries. For example, control circuitry 704 may wait for a query received subsequent to outputting the error message.

At 1206, control circuitry 704 determines whether a modified version of the first query has been received. The modified version of the first query may follow the same sentence structure as the first query. For example, control circuitry 704 may receive a query such as "Show me movies with Tom Cruise." This query may be the user's attempt to clarify his/her original query. Control circuitry 704 determines that five out of six words match with the original query and are in the same position in the respective sentences. Control circuitry 704 may compare the number of matching terms between the first query and the modified version and determine that the number (i.e., 5) exceeds a threshold number of matching terms (e.g., 3). In response to determining that the number exceeds the threshold number of matching terms, control circuitry 704 determines that a modified version of the first query has been received and advances to 1208 where control circuitry 704 determines whether the modified version of the first query comprises the template term.

In response to determining that the modified version of the first query has not been received, process 1200 returns to 1204. The loop between 1204 and 1206 may continue until a modified version of the first query is received. Control circuitry 704 may additionally measure a period of time since the error message was outputted. In response to determining that the period of time exceeds a threshold period of time, control circuitry 704 may end the loop and advance process 1200 to 1212.

At 1208, control circuitry 704 identifies the term in the first query that cannot not be parsed, preventing a response from being generated at 1202. In the overarching example, this term is "flicks." In response to identifying the term, control circuitry 704 determines whether the term has been replaced in the modified version of the first query. As discussed previously, the modified version of the first query includes the word "movies" instead of "flicks." Control circuitry 704 determines that the term "movies" is a template term found in the stored response templates and the vocabulary database. In response to determining that the modified version of the first query comprises the template term (e.g., "movies"), at 1210, control circuitry 704 determines that the input term in the first query (e.g., "flicks") shares a definition with the template term (e.g., "movies"). If control circuitry 704 still does not identify a template term in the modified version of the first query at 1208, process 1200 ends at 1212.

Figure 13:
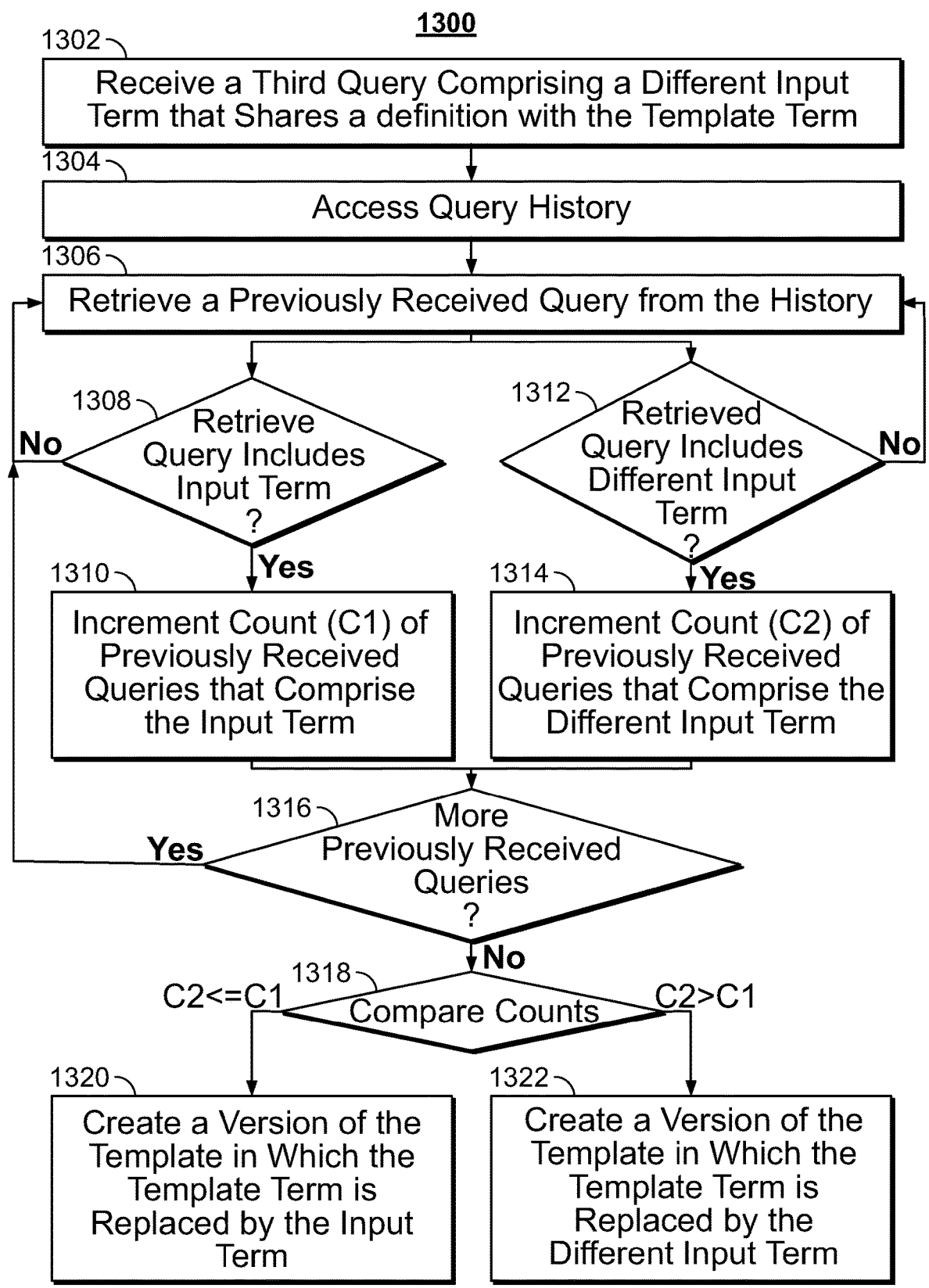
FIG. 13 is a flowchart of an illustrative process for providing personalized answers based on the number of times an input term is used in a plurality of queries, in accordance with some embodiments of the disclosure.

FIG. 13 is a flowchart of illustrative process 1300 for providing personalized answers based on the number of times an input term is used in a plurality of queries, in accordance with some embodiments of the disclosure. In some cases, control circuitry 704 may determine that there are multiple candidates that can be replacement terms for a template term. For example, at times a user may use the term "flicks" when describing "movies" and at times the user may use the term "films." In order to determine which input term to use when replacing a template term in a generated response or modified template, control circuitry 704 executes process 1300.

At 1302, control circuitry 704 receives a third query comprising a different input term (e.g., "films") that shares a definition with the template term (e.g., "movies"). At 1304, control circuitry 704 accesses a query history from memory (e.g., storage 708 of media device 802 or server 806). The query history is a list of queries received by control circuitry 704 and may be linked to a user profile. At 1306, control circuitry 704 retrieves a previously received query from the history (e.g., "play a flick on my television"). At 1308 and 1312, control circuitry 704 determines whether the retrieved query includes the input term or the different input term, respectively. In response to determining that the retrieve query includes the input term (e.g., "flicks"), at 1310, control circuitry 704 increments a first count (C1) of previously received queries that comprise the input term. At 1316, control circuitry 704 determines whether there are additional previously received queries. If control circuitry 704 determines that there are additional previously received queries, process 1300 returns to 1306 where control circuitry 704 retrieves another previously receive query (e.g., "what film starred Tom Cruise as a character named Jack?"). In this iteration, control circuitry 704 determines, at 1312, that the retrieved query includes the different input term (e.g., "film") and increments a second count (C2) of previously received queries that comprise the different input term. The loop between 1306 and 1316 continues until all previously received queries have been analyzed by control circuitry 704.

At 1318, control circuitry 704 compares C1 and C2 in order to determine which input term to use. Suppose that after several loops between 1306 and 1316, C1 equals 15 and C2 equals 10. In some embodiments, control circuitry 704 stores these values in the vocabulary database (specifically, in the entries of the input term and the different input term, respectively). In response to determining that C1 is greater than or equal to C2, at 1320, control circuitry 704 creates a version of the template in which the template term (e.g., "movie") is replaced by the input term ("flick"). In another example, suppose that C1 equals 10 and C2 equals 15. In response to determining that that C2 is greater than C1, at 1322, control circuitry 704 creates a version of the template in which the template term (e.g., "movie" is replaced by the different input term (e.g., "film").

Figure 14:
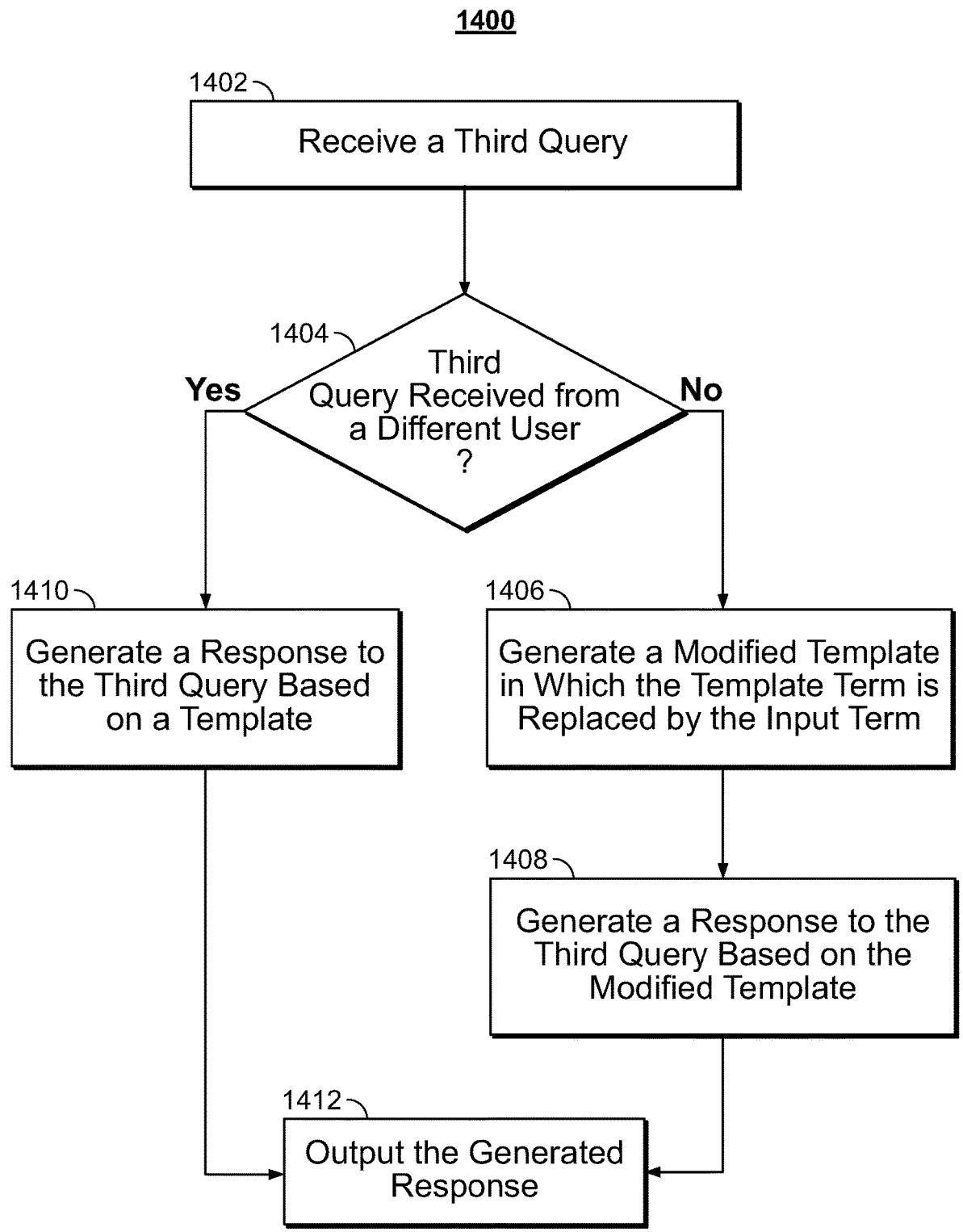
FIG. 14 is a flowchart of an illustrative process for providing answers to a different user, in accordance with some embodiments of the disclosure.

FIG. 14 is a flowchart of illustrative process 1400 for providing answers to a different user, in accordance with some embodiments of the disclosure. In some cases, different users may provide queries to the NLUI application. For example, in a household that has a smart speaker, multiple individuals may share the smart speaker. Process 1400 may thus may executed to distinguish between users. At 1402, control circuitry 704 receives a third query. Suppose that the third query is "I'm bored, what should I do?". As depicted in FIG. 6B, when a first user provided input query 608 "I'm bored, what should I do?" control circuitry 704 outputted "Why not watch a flick such as 'Halloween?'" via media device 602. At 1404, control circuitry 704 determines whether the third query was received from a different user than the first user. For example, if the third query is an audio clip, control circuitry 704 may use voice recognition to determine whether the voice model associated with the first query is different from the voice model associated with the third query. Control circuitry 704 may alternatively determine whether the third query is linked with a particular user profile that is different from the user profile linked with the first query (e.g., received from a different login account, different device, etc.).

In response to determining that the third query was received from a different user, control circuitry 704 generates a response to the third query based on a response template. For example, control circuitry 704 may identify a response template in the response template database that answers the third query. Control circuitry 704 may retrieve template terms and replacement terms from the vocabulary database, based on user identifier 508. The user identifier for the different user may be, for example, a particular name or an indicator of his/her voice pattern (e.g., a sine wave). Using the replacement terms, at 1410 control circuitry 704 may generate a response that uses the replacement terms. For example, the different user may use the input term "film" instead of "flicks." Accordingly, control circuitry 704 generates the response "Why not watch a film such as 'Halloween?'". In some embodiments, control circuitry 704 may simply generate a response based on the original response template (e.g., "Why not watch a movie such as 'Halloween?'").

In response to determining that the third query was not received from the different user, at 1406, control circuitry 704 generates a modified template in which the template term is replaced by the input term (e.g., "Why not watch a flick such as <movie name>?"). At 1408, control circuitry 704 generates a response to the third query based on the modified template. At 1412, control circuitry 704 outputs the response generated at either 1410 or 1408 depending on the determination made by control circuitry 704 at 1404.

Figure 15:
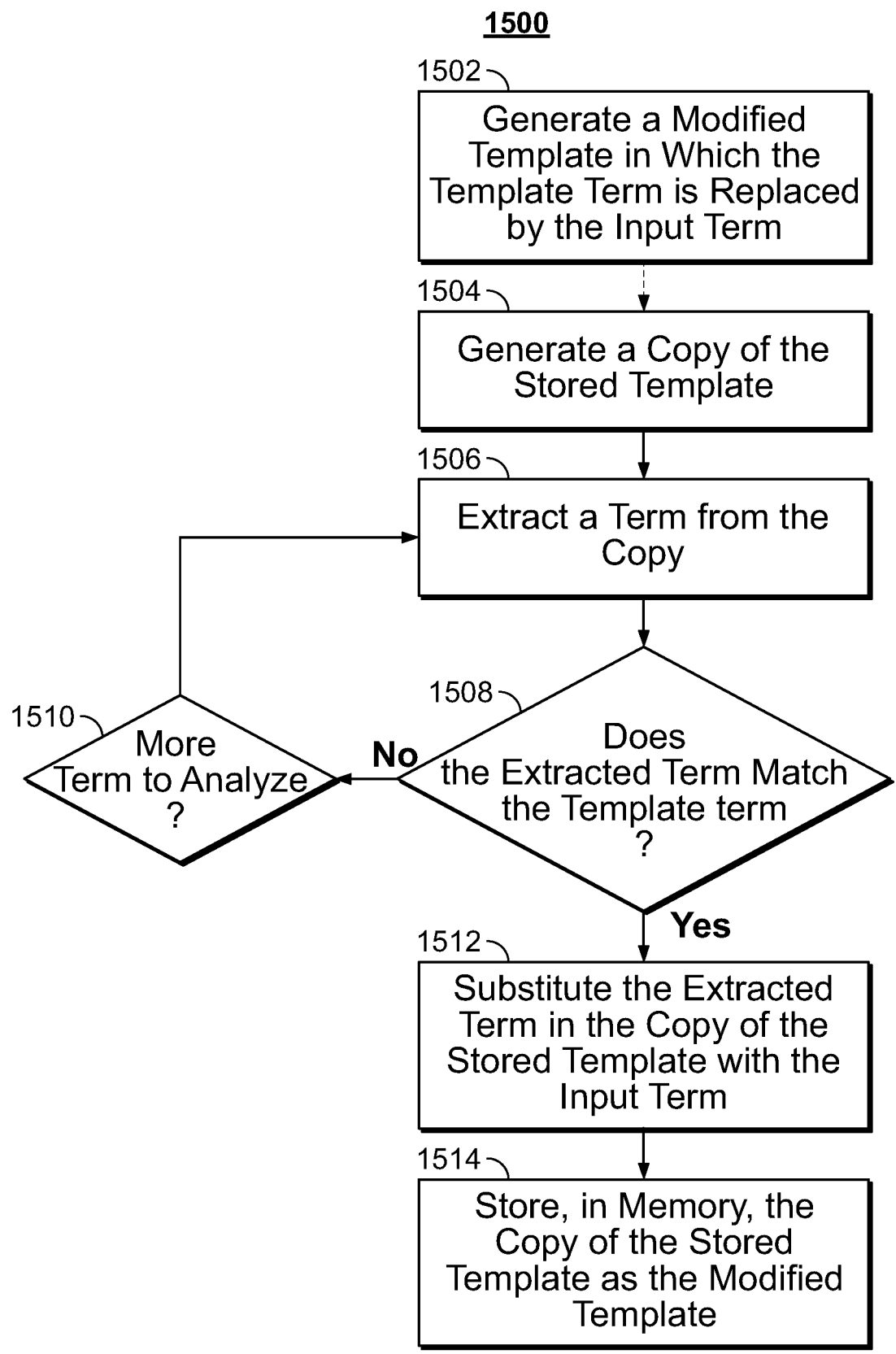
FIG. 15 is a flowchart of an illustrative process for substituting template terms with input terms, in accordance with some embodiments of the disclosure.

FIG. 15 is a flowchart of illustrative process 1500 for substituting template terms with input terms, in accordance with some embodiments of the disclosure. When generating a modified template at 912 (e.g. labelled as 1502 in FIG. 15), control circuitry 704 may execute process 1500. At 1504, control circuitry 704 generates a copy of the selected response template. At 1506, control circuitry 704 extracts a term from the copy of the response template. For example, the copy of selected response template may be read, "We found several movies with <information modifier> for you." The extracted term may be "movies." At 1508, control circuitry 704 determines whether the extracted term (e.g., "movies") matches the template term (e.g., "movies"). In response to determining that the respective terms match, at 1512, control circuitry 704 substitutes the extracted term in the copy of the selected response template with the input term (e.g., "flicks"). In response to determining that the respective terms do not match, at 1510, control circuitry 704 determines whether there are additional terms in the copy to analyze (e.g., "we," "found," etc.). If control circuitry 704 determines that there are additional terms to analyze, process 1500 returns to 1506. At 1514, control circuitry 704 stores in memory (e.g., storage 708 of media device 802 or server 806) the copy of the selected response template as the modified template.

Figure 16:
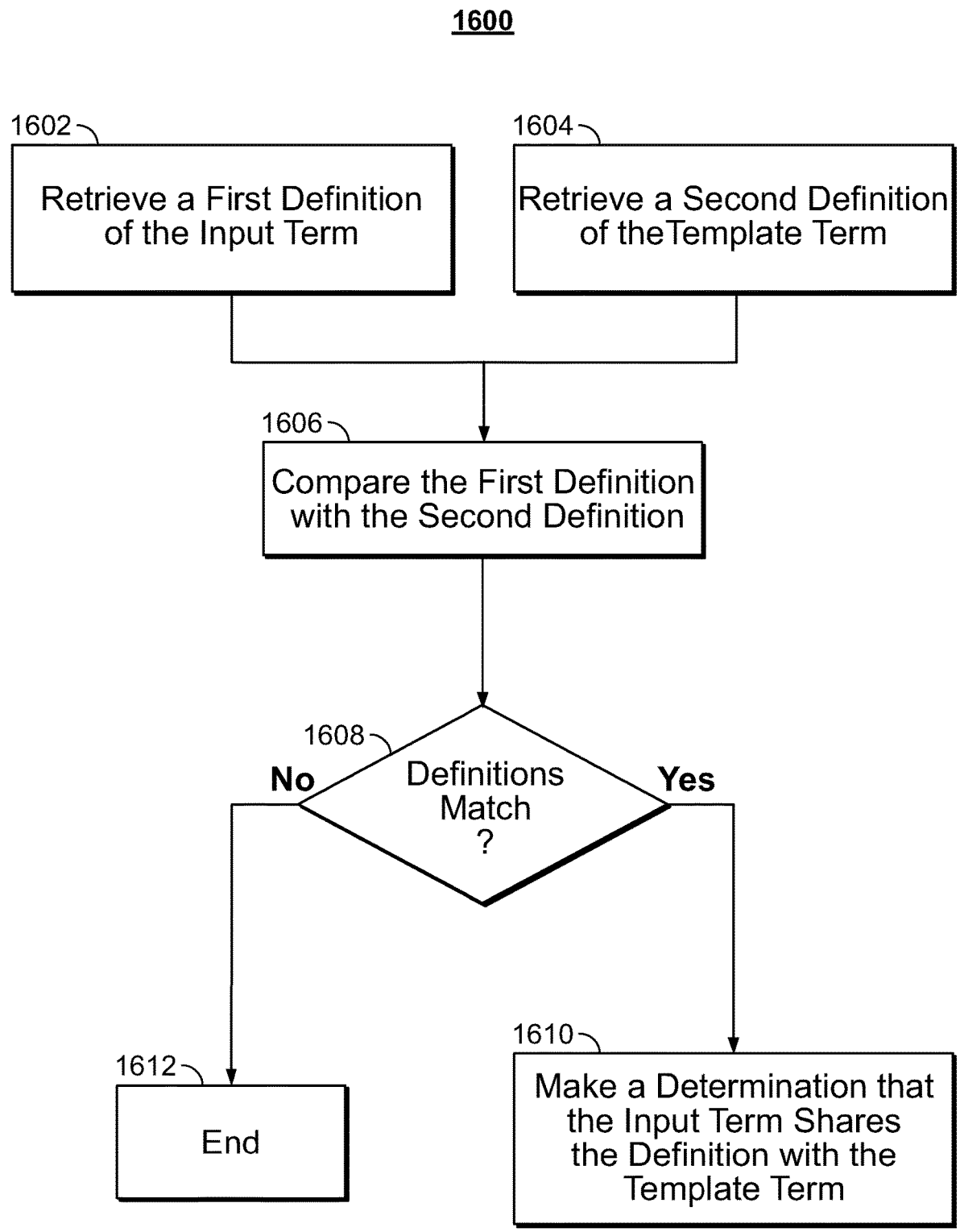
FIG. 16 is a flowchart of an illustrative process for determining whether the definitions of the input term and template term match, in accordance with some embodiments of the disclosure.

FIG. 16 is a flowchart of illustrative process 1600 for determining whether the definitions of the input term and template term match, in accordance with some embodiments of the disclosure. When determining whether two terms share a definition at 910 or 1012, control circuitry 704 may execute process 1600. At 1602, control circuitry 704 retrieves (e.g., from the Internet via communication network 804 or storage 708) a first definition of the input term (e.g., definition 306 of input term 302). At 1604, control circuitry 704 retrieves a second definition of the template term (e.g., definition 306 of template term 304). At 1606, control circuitry 704 compares the first definition with the second definition. At 1608, control circuitry 704 determines whether the definitions match. For example, control circuitry 704 may determine the number of words in each definition that are shared and whether they are in the same positions in the respective definitions. This number may be compared with a threshold value indicating the minimum number of words that need to be the same and in the same position in the respective definitions to be considered the matching definitions. In response to determining that the definitions match, at 1610, control circuitry 704 determines that the input term shares the definition with the template term. In response to determining that the definitions do not match, process 1600 ends at 1612.

It should be noted that processes 900-1600 or any step thereof could be performed on, or provided by, any of the devices shown in FIGS. 7-8. For example, the processes may be executed by control circuitry 704 (FIG. 7) as instructed by a NLUI application implemented on media device 802 and/or server 808. In addition, one or more steps of a process may be incorporated into or combined with one or more steps of any other process or embodiment (e.g., steps from process 900 may be combined with steps from process 1100). In addition, the steps and descriptions described in relation to FIGS. 9-16 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for providing personalized answers to a user's query using a learned user vocabulary, the method comprising:
   receiving a first query from a first user;
   retrieving a stored response template from a database, wherein:
      the stored response template comprises a plurality of terms including one or more dynamic terms and one or more non-dynamic terms; and
      prior to customizing the stored response template for the first user, the stored response template is used to generate a plurality of responses to a plurality of previously received queries, and for each respective response of the plurality of responses:
         the one or more dynamic terms of the stored response template are modified based on an answer to the corresponding query of the plurality of previously received queries, and the respective modified one or more dynamic terms are included in the respective responses and are different for each respective response of the plurality of responses; and the one or more non-dynamic terms of the stored response template are included, without modification, in each of the plurality of responses, regardless of respective answers included in the plurality of responses;

determining that the first query comprises an input term that shares a definition with a non-dynamic term of the one or more dynamic terms in the stored response template;

in response to determining that the first query comprises the input term that shares the definition with the non-dynamic term in the stored response template, customizing the stored response template for the first user by:
generating, based on the stored response template, a modified response template in which the non-dynamic term is replaced with the input term;

generating a first response to the first query based on the modified response template, wherein the generated first response comprises the input term;

outputting the generated first response that comprises the input term and that does not comprise the non-dynamic term;

storing the modified response template in the database;

receiving a second query that does not comprise the input term;

generating a second response to the second query based on the modified response template, wherein the generated second response comprises the input term; and outputting the generated second response.

2. The method of claim 1, wherein generating and storing the modified response template further comprises:
generating a copy of the stored response template;
identifying the non-dynamic term in the copy of the stored response template;
substituting the non-dynamic term in the copy of the stored response template with the input term; and
storing, in the database, the copy of the stored response template as the modified response template.

3. The method of claim 1, wherein determining that the first query comprises the input term that shares the definition with the non-dynamic term comprises:
in response to determining that a response to the first query cannot be generated, outputting an indication that a response cannot be generated;
receiving a modified version of the first query;
determining that the modified version of the first query comprises the non-dynamic term; and
in response to determining that the modified version of the first query comprises the non-dynamic term, determining that the input term shares the definition with the non-dynamic term.

4. The method of claim 1, wherein determining that the first query comprises the input term that shares the definition with the non-dynamic term comprises:
retrieving a first definition of the input term and a second definition of the non-dynamic term, wherein the first definition and the second definition are text strings;
comparing the first definition with the second definition; and
in response to determining, based on the comparing, that the first definition matches the second definition, determining that the input term shares the definition with the non-dynamic term.

5. The method of claim 1, further comprising:
receiving a third query comprising a different input term that shares a definition with the non-dynamic term;
retrieving, from memory, the plurality of previously received queries;
determining a first amount of the plurality of previously received queries that comprise the input term and a second amount of the plurality of previously received queries that comprise the different input term;
determining whether the second amount is greater than the first amount; and
in response to determining that the second amount is greater than the first amount, replacing the non-dynamic term in the modified response template with the different input term.

6. The method of claim 1, further comprising:
receiving a third query;
determining that the first query was received from a first user and that the third query was received from a second user different from the first user;
in response to determining that the third query was received from the second user, generating a response to the third query based on the stored response template, wherein the response to the third query comprises the non-dynamic term; and
outputting the response to the third query.

7. The method of claim 1, wherein generating the first response to the first query based on the modified response template further comprises:
determining a search result for the first query; and
outputting the search result with the generated first response.

8. A method for providing personalized answers to a user's query using a learned user vocabulary, the method comprising:
receiving a first query from a first user;
retrieving a stored response template from a database, wherein:
the stored response template comprises a plurality of terms including one or more dynamic terms and one or more non-dynamic terms; and
prior to customizing a first response to the first query for the first user, the stored response template is used to generate a plurality of responses to a plurality of previously received queries, and for each respective response of the plurality of responses:
the one or more dynamic terms of the stored response template are modified based on an answer to the corresponding query of the plurality of previously received queries, and the respective modified one or more dynamic terms are included in the respective responses and are different for each respective response of the plurality of responses; and
the one or more non-dynamic terms of the stored response template are included, without modification, in each of the plurality of responses, regardless of respective answers included in the plurality of responses;
generating a first response to the first query based on the stored response template, wherein the first response comprises a non-dynamic term;
determining that the first query comprises an input term that shares a definition with the non-dynamic term in the first response;
storing the input term in a vocabulary database as a replacement term for the non-dynamic term;

in response to determining that the first query comprises the input term that shares the definition with the non-dynamic term in the stored response template, customizing the first response for the first user by:
  modifying the first response to replace the non-dynamic term with the input term;
outputting the modified first response that comprises the input term and that does not comprise the non-dynamic term;
receiving a second query that does not comprise the input term;
generating a second response to the second query, wherein the second response comprises the non-dynamic term;
in response to determining that the vocabulary database comprises the input term as the replacement term for the non-dynamic term, modifying the second response to replace the non-dynamic term with the replacement term; and
outputting the modified second response.

9. The method of claim 8, wherein determining that the first query comprises the input term that shares the definition with the template non-dynamic term further comprises:
  determining that the input term is not in the vocabulary database, wherein the vocabulary database comprises terms used to generate responses to queries of a user; and
  in response to determining that the input term shares the definition with the non-dynamic term in the vocabulary database, performing the storing of the input term in the vocabulary database as the replacement term for the non-dynamic term.

10. A system for providing personalized answers to a user's query using a learned user vocabulary, the system comprising:
  an input interface configured to:
    receive a first query from a first user; and
    retrieve a stored response template from a database, wherein:
      the stored response template comprises a plurality of terms including one or more dynamic terms and one or more non-dynamic terms; and
      prior to customizing the stored response template for the first user, the stored response template is used to generate a plurality of responses to a plurality of previously received queries, and for each respective response of the plurality of responses:
        the one or more dynamic terms of the stored response template are modified based on an answer to the corresponding query of the plurality of previously received queries, and the respective modified one or more dynamic terms are included in the respective responses and are different for each respective response of the plurality of responses; and
        the one or more non-dynamic terms of the stored response template are included, without modification, in each of the plurality of responses, regardless of respective answers included in the plurality of responses;
  control circuitry configured to:
    determine that the first query comprises an input term that shares a definition with a non-dynamic term in the stored response template;
    in response to determining that the first query comprises the input term that shares the definition with the non-dynamic term, customize the stored response template for the first user by:
      generating, based on the stored response template, a modified response template in which the non-dynamic term is replaced with the input term;
    generate a first response to the first query based on the modified response template, wherein the generated first response comprises the input term;
    output the generated first response that comprises the input term and that does not comprise the non-dynamic term; and
    store the modified response template in the database;
  wherein the input interface is further configured to:
    receive a second query that does not comprise the input term; and
  wherein the control circuitry is further configured to:
    generate a second response to the second query based on the modified response template, wherein the generated second response comprises the input term; and
    output the generated second response.

11. The system of claim 10, wherein the control circuitry is further configured to generate and store the modified response template by:
  generating a copy of the stored response template;
  identifying the non-dynamic term in the copy of the stored response template;
  substituting the non-dynamic term in the copy of the stored response template with the input term; and
  storing, in the database, the copy of the stored response template as the modified response template.

12. The system of claim 10, wherein the control circuitry is further configured to determine that the first query comprises the input term that shares the definition with the non-dynamic term by:
  in response to determining that a response to the first query cannot be generated, outputting an indication that a response cannot be generated;
  receiving, via the input interface, a modified version of the first query;
  determining that the modified version of the first query comprises the template term; and
  in response to determining that the modified version of the first query comprises the non-dynamic term, determining that the input term shares the definition with the non-dynamic term.

13. The system of claim 10, wherein the control circuitry is further configured to determine that the first query comprises the input term that shares the definition with the non-dynamic term by:
  retrieving a first definition of the input term and a second definition of the non-dynamic term, wherein the first definition and the second definition are text strings;
  comparing the first definition with the second definition; and
  in response to determining, based on the comparing, that the first definition matches the second definition, determining that the input term shares the definition with the non-dynamic term.

14. The system of claim 10, wherein the control circuitry is further configured to:
  receive, via the input interface, a third query comprising a different input term that shares a definition with the non-dynamic term;
  retrieve, from memory, the plurality of previously received queries;
  determine a first amount of the plurality of previously received queries that comprise the input term and a second amount of the plurality of previously received queries that comprise the different input term;

determine whether the second amount is greater than the first amount; and in response to determining that the second amount is greater than the first amount, replace the non-dynamic term in the modified response template with the different input term.

15. The system of claim 10, wherein the control circuitry is further configured to:

receive, via the input interface, a third query;

determine that the first query was received from a first user and that the third query was received from a second user different from the first user;

in response to determining that the third query was received from the second user, generate a response to the third query based on the stored response template, wherein the response to the third query comprises the non-dynamic term; and output the response to the third query.

16. The system of claim 10, wherein the control circuitry is further configured to generate the first response to the first query based on the modified response template by:

determining a search result for the first query; and outputting the search result with the generated first response.

17. The system of claim 10, wherein the control circuitry is further configured to:

generate an initial version of the first response to the first query based on the stored response template, wherein the initial version of the first response comprises the non-dynamic term;

determine that the first query comprises the input term that shares the definition with the non-dynamic term in the initial version of the first response;

in response to determining that the first query comprises the input term that shares the definition with the non-dynamic term, modify the initial version of the first response to replace the non-dynamic term with the input term; and output the modified initial version of the first response as the first response.

18. The method of claim 1, further comprising:

determining a number of the plurality of previously received queries that comprise the input term; and generating the modified response template further based on the determined number.

19. The method of claim 8, further comprising:

determining a number of the plurality of previously received queries that comprise the input term; and modifying the first response to replace the non-dynamic term with the input term based on the determined number.

20. The system of claim 10, wherein the control circuitry is further configured to:

determine a number of the plurality of previously received queries that comprise the input term;

generate the modified response template further based on the determined number.

* * * * *